(12) United States Patent
Groves et al.

(10) Patent No.: US 10,508,745 B2
(45) Date of Patent: Dec. 17, 2019

(54) VALVE ASSEMBLY

(71) Applicant: THE OILGEAR COMPANY, Traverse City, MI (US)

(72) Inventors: Frank Groves, Bend, OR (US); Josh Groves, Traverse City, MI (US); Tyler Zawacki, Traverse City, MI (US); Zach Beery, Traverse City, MI (US)

(73) Assignee: THE OILGEAR COMPANY, Traverse City, MI (US)

( * ) Notice: Subject to any disclaimer, the term of this patent is extended or adjusted under 35 U.S.C. 154(b) by 370 days.

(21) Appl. No.: 15/268,363

(22) Filed: Sep. 16, 2016

(65) Prior Publication Data

US 2017/0082211 A1    Mar. 23, 2017

Related U.S. Application Data

(63) Continuation-in-part of application No. 14/857,853, filed on Sep. 18, 2015, now abandoned.

(60) Provisional application No. 62/220,272, filed on Sep. 18, 2015.

(51) Int. Cl.
*F16K 11/07* (2006.01)
*F16K 31/122* (2006.01)

(52) U.S. Cl.
CPC ............ *F16K 11/07* (2013.01); *F16K 31/122* (2013.01); *Y10T 137/86582* (2015.04); *Y10T 137/86895* (2015.04)

(58) Field of Classification Search
CPC .... F16K 11/44; F16K 31/122; F16K 31/1221; F16K 31/163; F16K 11/07; F16K 11/0716; F16K 31/0627; F16K 31/0634; Y10T 137/86895; Y10T 137/86622; Y10T 137/8663; Y10T 137/86702; Y10T 138/86582
USPC .............. 137/625.5, 625.68, 625.65, 625.66, 137/625.48, 625.49, 625.25, 625.26, 137/625.27, 625.67, 884
See application file for complete search history.

(56) References Cited

U.S. PATENT DOCUMENTS

| 920,716 | A | * | 5/1909 | Beckman | ................ F16K 47/10 |
| | | | | | 137/513.3 |
| 2,524,142 | A | * | 10/1950 | Seeloff | ................ F16K 11/0712 |
| | | | | | 137/625.48 |
| 2,576,315 | A | * | 11/1951 | Edward | ................ B01F 1/0022 |
| | | | | | 137/268 |
| 2,722,234 | A | | 11/1955 | MacGeorge et al. | |
| 2,913,005 | A | | 11/1959 | Grant et al. | |

(Continued)

*Primary Examiner* — Craig J Price
(74) *Attorney, Agent, or Firm* — David G. Woodral; GableGotwals

(57) ABSTRACT

A valve assembly includes an upper sleeve, a lower sleeve, and a poppet contained between the upper and lower sleeve and operable between a first and second position. The poppet includes a first end, a second end, a side, a central cavity, and a hydraulic port. The second end is spaced from the first end, the side is adjacent one of the first end and the second end. The central cavity extends from the first end of the poppet towards the second end of the poppet. The hydraulic port extends from the side of the poppet into the central cavity. The hydraulic port is configured to receive hydraulic fluid at a first flow rate from the supply port and to supply hydraulic fluid to the central cavity at a second flow rate less than the first flow rate.

12 Claims, 13 Drawing Sheets

(56) References Cited

U.S. PATENT DOCUMENTS

| | | | |
|---|---|---|---|
| 2,920,653 A * | 1/1960 | Wolff | F16K 11/044 137/599.08 |
| 3,329,165 A | 7/1967 | Lang | |
| 3,381,710 A | 5/1968 | Hribar et al. | |
| 3,706,322 A * | 12/1972 | Carlson | F16K 11/0716 137/625.66 |
| 3,765,449 A | 10/1973 | Cole | |
| 3,794,075 A * | 2/1974 | Stoll | F15B 13/0405 137/625.66 |
| 3,805,837 A | 4/1974 | Stampfli | |
| 3,921,660 A | 11/1975 | Kowalski | |
| 3,993,100 A | 11/1976 | Pollard et al. | |
| 4,095,421 A | 6/1978 | Silcox | |
| 4,150,687 A * | 4/1979 | Blanton | F16K 17/00 137/458 |
| 4,185,652 A | 1/1980 | Zintz et al. | |
| 4,254,798 A * | 3/1981 | Ott | F16K 11/065 137/625.64 |
| 4,393,751 A | 7/1983 | Kelley | |
| 4,467,825 A | 8/1984 | Boyd | |
| 4,492,252 A * | 1/1985 | Kanai | F25B 41/046 137/625.43 |
| 4,493,335 A | 1/1985 | Watson | |
| 4,497,369 A | 2/1985 | Hurta et al. | |
| 4,501,289 A * | 2/1985 | Pauliukonis | F16K 11/044 137/315.4 |
| 4,561,468 A * | 12/1985 | Kreitchman | F02C 7/232 137/508 |
| 4,565,217 A * | 1/1986 | McIntyre | B05C 5/0225 137/563 |
| 4,706,932 A | 11/1987 | Yoshida et al. | |
| 4,726,398 A * | 2/1988 | Barree | F16K 11/044 137/625.5 |
| 4,777,800 A | 10/1988 | Hay, II | |
| 4,880,033 A | 11/1989 | Neff | |
| 4,915,134 A * | 4/1990 | Toliusis | F16K 11/044 137/625.27 |
| 4,955,195 A | 9/1990 | Jones et al. | |
| 5,211,198 A * | 5/1993 | Tinholt | F16K 1/36 137/625.27 |
| 5,261,442 A * | 11/1993 | Kingsford | F16K 11/048 137/312 |
| 5,261,456 A * | 11/1993 | Patton | F15B 13/0402 137/625.64 |
| 5,518,030 A | 5/1996 | Liu et al. | |
| 5,778,918 A | 7/1998 | McLelland | |
| 5,878,647 A | 3/1999 | Wilke et al. | |
| 5,901,749 A | 5/1999 | Watson | |
| 6,192,680 B1 | 2/2001 | Brugman et al. | |
| 6,209,582 B1 * | 4/2001 | Ashley | B60T 8/327 137/625.5 |
| 6,536,475 B2 * | 3/2003 | Tokuda | F16K 11/044 137/625.5 |
| 6,655,405 B2 | 12/2003 | Hollister et al. | |
| 6,772,791 B2 * | 8/2004 | Neff | F16K 31/0613 137/625.65 |
| 6,779,543 B2 | 8/2004 | Hollister et al. | |
| 7,047,993 B2 * | 5/2006 | Manaka | F15B 13/042 137/14 |
| 7,243,671 B2 | 7/2007 | Thrash et al. | |
| 7,448,411 B2 * | 11/2008 | Friedman | F16K 11/044 137/625.48 |
| 7,520,129 B2 | 4/2009 | Springett | |
| 7,520,297 B2 | 4/2009 | Bell et al. | |
| 7,757,772 B2 | 7/2010 | Donohue et al. | |
| 7,921,880 B2 | 4/2011 | Jackson et al. | |
| 8,282,020 B2 | 10/2012 | Kiss et al. | |
| 8,434,518 B2 * | 5/2013 | Okamoto | F16K 31/0655 137/596.17 |
| 8,469,048 B2 | 6/2013 | Bresnahan | |
| 8,490,705 B2 | 7/2013 | Curtiss, III | |
| 8,991,427 B2 * | 3/2015 | Larsen | F16K 11/044 137/625.17 |
| 9,022,069 B2 * | 5/2015 | Neff | F16K 39/022 137/601.18 |
| 2007/0251588 A1 | 11/2007 | Linder et al. | |
| 2007/0267076 A1 | 11/2007 | Strauss et al. | |
| 2008/0223467 A1 | 9/2008 | Tveita | |
| 2012/0279720 A1 | 11/2012 | Whitby et al. | |
| 2014/0061516 A1 | 3/2014 | Gustafson et al. | |

\* cited by examiner

VALVE ASSEMBLY

CROSS-REFERENCE TO RELATED APPLICATIONS

This application is a continuation-in-part of U.S. patent application Ser. No. 14/857,853, filed Sep. 18, 2015. This application also claims the benefit of, and priority to, U.S. Provisional Patent Application No. 62/220,272, filed Sep. 18, 2015. Both U.S. patent application Ser. No. 14/857,853 and U.S. Provisional Patent Application No. 62/220,272 are hereby incorporated by reference herein in their entireties.

TECHNICAL FIELD

Embodiments of the present disclosure relate to a valve assembly.

BACKGROUND

A valve is often used to control a flow of fluid. Some valves, known as two-position, three-way hydraulic valves have three separate fluid connections and are operable between a first position (e.g., closed), where a first pair from the three separate fluid connections are coupled, and a second position (e.g., open), where a second pair from the three separate fluid connections are coupled. Valves may be mounted on a sub-plate that connects the valve to various piping. Sub-plate mounted valves are commonly used in blowout preventer (BOP) and remotely operated vehicle (ROV) applications. Sub-plate mounted valves may experience several shortcomings in applications where extreme reliability, near-zero leakage, or high flow efficiency are required. For example, sub-plate mounted valves may be susceptible to flow force, may be susceptible to increased wear, may have a short service life, and may experience water-hammer. Accordingly, reducing these shortcomings is of paramount importance in the design of new valves.

SUMMARY

Systems, methods, and apparatuses for a valve assembly are provided. One embodiment relates to a valve assembly. The valve assembly includes an upper sleeve, a lower sleeve, and a poppet. The lower sleeve is coupled to the upper sleeve. The lower sleeve includes a bottom face, a side, a supply port, and a pilot port. The supply port extends through the side of the lower sleeve. The pilot port extends through the bottom face of the lower sleeve. The poppet is operable between a first position and a second position. The poppet is contained between the upper sleeve and the lower sleeve. The poppet includes a first end, a second end, a side, a central cavity, and a hydraulic port. The second end is spaced from the first end, the side is adjacent one of the first end and the second end. The central cavity extends from the first end of the poppet towards the second end of the poppet. The hydraulic port extends from the side of the poppet into the central cavity. The hydraulic port is configured to receive hydraulic fluid at a first flow rate from the supply port and to supply hydraulic fluid to the central cavity at a second flow rate less than the first flow rate.

Another embodiment relates to a poppet for a valve assembly. The poppet includes a first cylindrical portion, a second cylindrical portion, an intermediate portion, and a lower portion. The first cylindrical portion has a first diameter. The second cylindrical portion has a diameter substantially equal to the first diameter. The intermediate portion is located between the first cylindrical portion and the second cylindrical portion. The intermediate portion has a second diameter greater than the first diameter. The intermediate portion includes a vent surface proximate the first cylindrical portion and a supply surface opposite the second cylindrical portion. The lower portion is integral with the second cylindrical portion. The lower portion has an edge with a diameter substantially equal to the second diameter. The lower portion includes a lower surface between the edge and the second cylindrical portion. The supply surface has a first area and the lower surface has a second area equal to the first area.

Yet another embodiment relates to a method of selectively routing fluid using a valve assembly. The method includes providing a valve assembly having a poppet, where the poppet has a central cavity provided therein, and a lower seal, where the lower seal has a supply port, a pilot port, a poppet chamber, and a bottom face provided thereon; introducing hydraulic fluid to the supply port of the lower seal of the valve assembly, the hydraulic fluid accumulating in the central cavity of the poppet located inside the valve assembly and biasing the poppet towards a first position; introducing hydraulic fluid to the pilot port of the lower seal of the valve assembly, the hydraulic fluid accumulating in the poppet chamber between the bottom face of the lower seal and the poppet, the hydraulic fluid biasing the poppet towards a second position; and discharging hydraulic fluid from the central cavity as the valve assembly moves towards the second position.

These and other features, together with the organization and manner of operation thereof, may become apparent from the following detailed description when taken in conjunction with the accompanying drawings.

DETAILED DESCRIPTION

Figure 1:
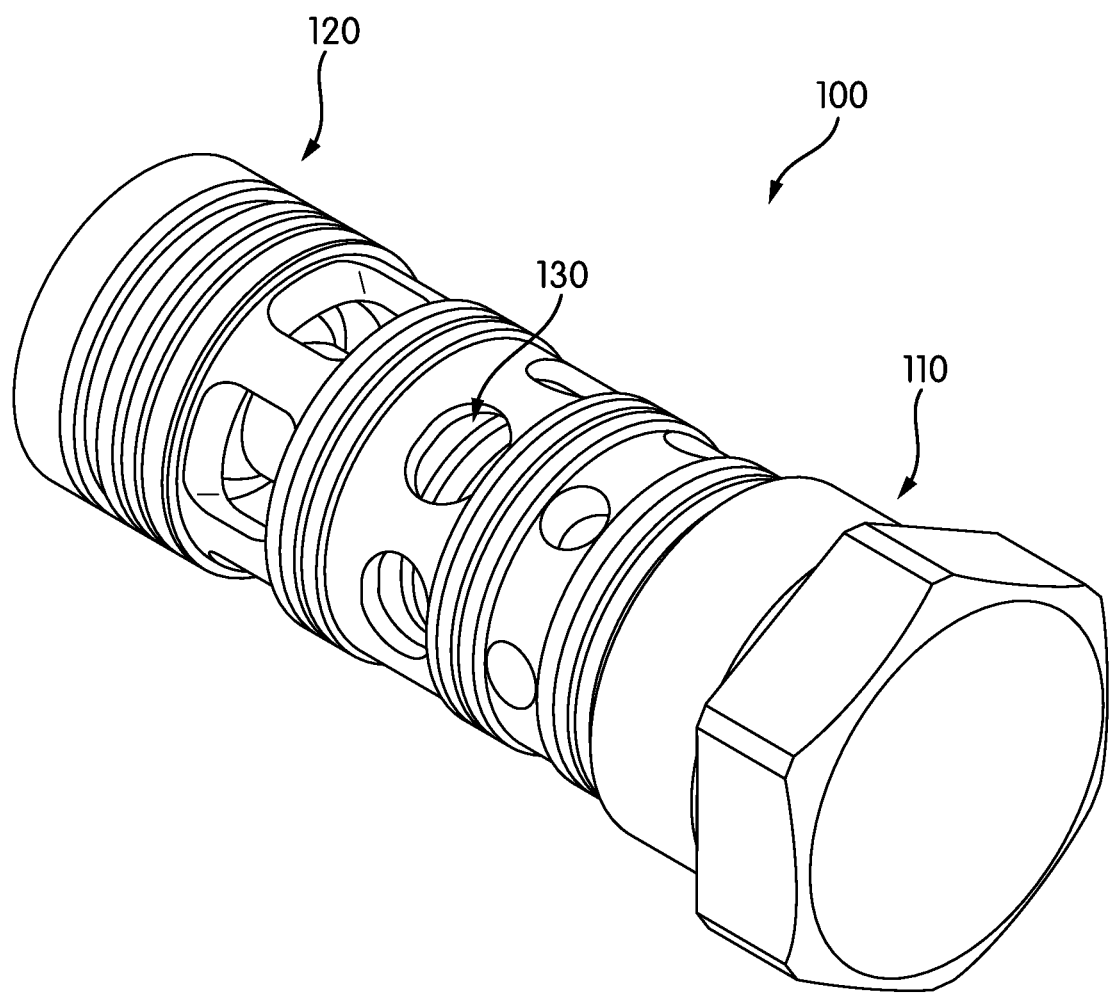
FIG. 1 is a prospective view of a valve having a first configuration, according to an exemplary embodiment.

Referring to the Figures generally, systems, methods, and apparatuses for a valve assembly are provided herein wherein the valve assembly is adapted to be positioned one of multiple positions, a first position and a second position. The valve assembly can be adapted for movement between more than two positions.

In the use of hydraulic valves (e.g., two-position valves, three-way valves, etc.), it is desirable to ensure that no leakage occurs between the first, open position and the second, closed position and that the valve operates efficiently while maintaining a long service life. In this sense, efficiency relates to the hydraulic valve's ability to be maintained as close to a true open position and a true closed position as possible. These goals are particularly difficult to reach in critical environments such as offshore and subsea applications. In these applications, remotely operated vehicles (ROVs) typically incorporate valves that control actuation of important blowout preventer (BOP) functions (e.g., deadman switch, auto shear, etc.).

Conventionally, the valves used in these applications are two-position, pilot-operated hydraulic control valves. In some cases, these valves are referred to as sub-plate mounted (SPM) valves. Many of these conventional valves are operable between an open position and a closed position and utilize a supply port, an outlet port, and a vent port. In the closed position, communication is blocked between the supply port and the outlet port, and the outlet port is in communication with the vent port. In the open position, the supply port is in communication with the outlet port and communication is blocked to the vent port.

The conventional valves typically incorporate a central sheath that seals off one port while connecting the other two. In many valves, the inlet port is on the side, the outlet port is at or near the bottom, and the vent port is on the side. Largely due to this configuration, conventional valves are prone to sticking between the open position and the closed position and exhibit flow force susceptibility, low flow efficiency as a function of valve size, excessive wear, common misalignment, lack of dampening, lack of impact control, and excessive water-hammer.

The valve assembly described herein utilizes a pressure-assisted poppet that receives hydraulic fluid from the supply port. This pressure-assisted poppet facilitates sealing at an open position and a closed position with reduced leakage compared to conventional valves. This poppet also utilizes a balanced geometry proximate the supply port to facilitate quick shifting of the valve assembly between the open position and the closed position. Shifting of the valve assembly may be caused by applying force to a pilot area at a base of the poppet using hydraulic fluid. Shifting of the valve may also be caused by filling a central cavity running through the center of the poppet with hydraulic fluid. A spring may be located in the central cavity to assist in shifting of the valve and also to resist shifting of the valve.

The poppet of the valve assembly described herein incorporates a speed control orifice that controls the rate at which hydraulic fluid is received by, and expelled from, the poppet. In this way, the speed control orifice controls the shifting time of the valve assembly between the open position and the closed position. The pilot area allows the poppet to overcome flow forces and to thereby remain open at higher flow rates than conventional valves. The pilot area and the central cavity also allow the poppet to operate between two hydraulic cushions which each serve to decelerate the poppet near the open position or the closed position. The hydraulic cushions help to mitigate system pressure spikes, thereby increasing durability and reliability of the valve. The valve also includes wear bands that substantially eliminate direct interfacing of the poppet with a sleeve, thereby further increasing durability and reliability of the valve.

Referring to FIGS. 1-3 and 14, an assembly, shown as valve assembly 100 (e.g., two-way, three position valve, hydraulic valve, etc.), is shown. As shown in FIG. 1, valve assembly 100 includes a first component or member, shown as upper sleeve 110 (e.g., upper sleeve, main sleeve, etc.), which is coupled (e.g., connected, attached, fixed, etc.) to a second component or member, shown as lower sleeve 120 (e.g., lower sleeve, etc.). For example, upper sleeve 110 may be coupled to lower sleeve 120 through the use of a wire. In one embodiment, lower sleeve 120 is inserted in and secured to upper sleeve 110. The lower sleeve 120 is substantially coplanar to the upper sleeve 110. A shaft, shown as poppet 130 (e.g., shaft, rod, etc.), is located (e.g., contained, received, etc.) within upper sleeve 110 and lower sleeve 120. Poppet 130 is movable within upper sleeve 110 and lower sleeve 120 between a first position, defining a closed position of valve assembly 100, and a second position, defining an open position of valve assembly 100. Valve assembly 100 may be configured to be a normally-opened valve or a normally-closed valve. In the normally-open configuration, supply port 706 acts like vent port 406 in the normally-closed configuration and vent port 406 acts like supply port 706 in the normally-closed configuration.

According to various embodiments, valve assembly 100 is attached to a first fluid connection, a second fluid connection, and a third fluid connection. In these embodiments, poppet 130 prohibits a fluid connection between the first fluid connection and both of the second fluid connection and the third fluid connection when in the first position, and poppet facilitates a fluid connection between the first fluid connection and the second fluid connection when in the second position.

Figure 2:
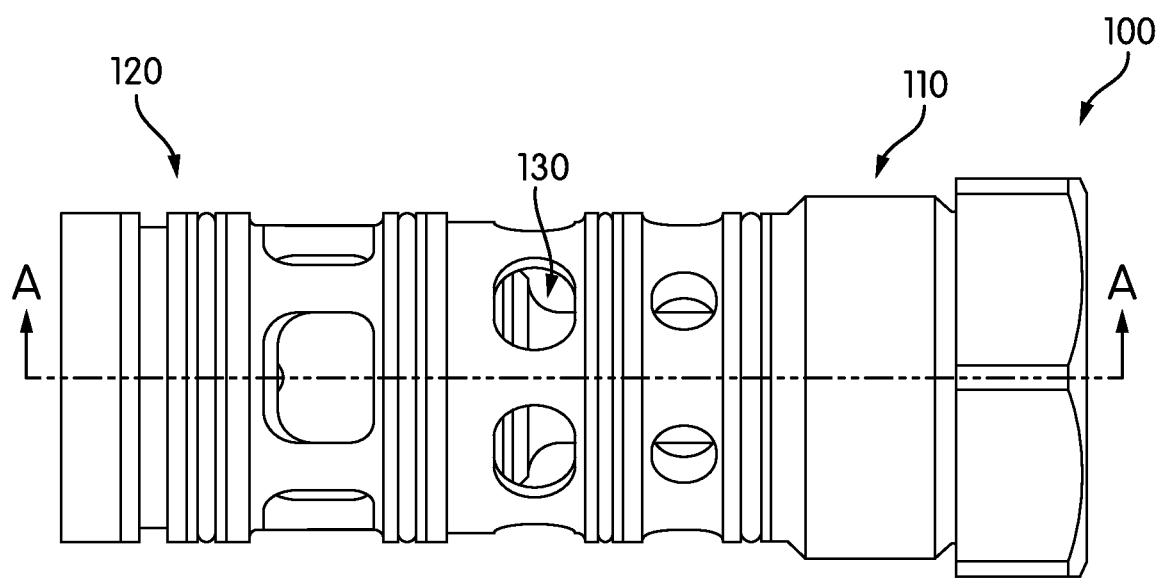
FIG. 2 is a side view of the valve shown in FIG. 1.
Figure 3:
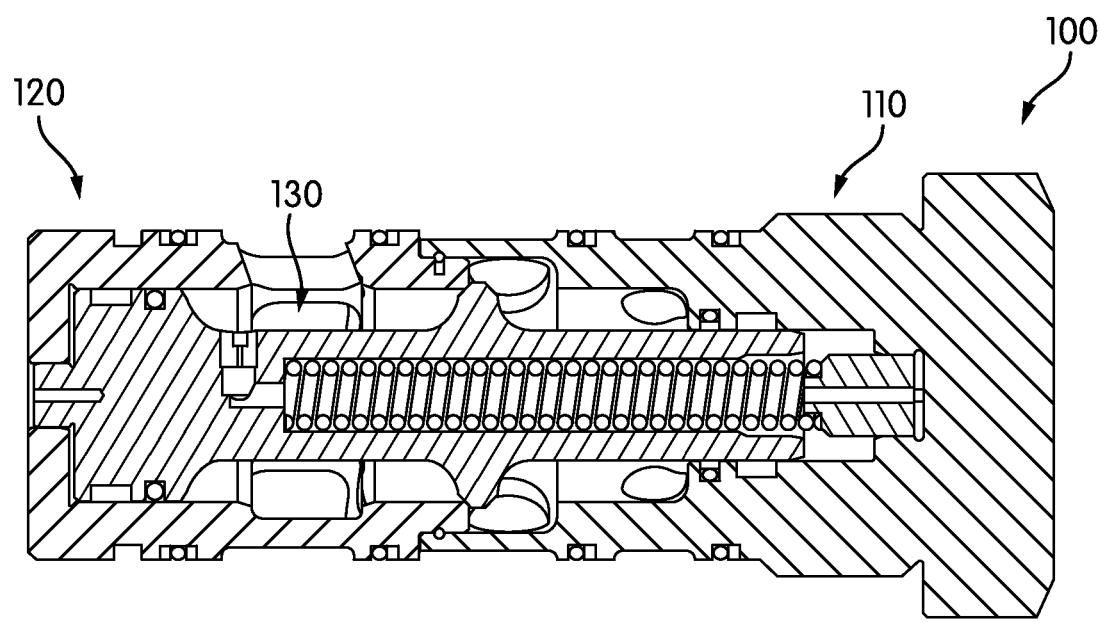
FIG. 3 is a cross-sectional view of the valve shown in FIG. 2 about plane A-A, in a first position.

FIG. 3 is a cross-sectional view of valve assembly 100 taken along line A-A shown in FIG. 2. As shown in FIG. 3, valve assembly 100 is in the first position (e.g., closed position). As will be discussed herein, poppet 130 is movable such that valve assembly 100 can be operated between the first position and a second position (e.g., open position). In this way, valve assembly 100 can selectively fluidly couple two ports.

In many applications, valve assembly 100 is used to provide hydraulic control of various components, structures, and assemblies. For example, valve assembly 100 may be utilized in offshore and subsea applications. In one application, valve assembly 100 is implemented in blowout preventers (BOPS) in remotely operated vehicles (ROVs). Valve assembly 100 may be used to provide hydraulic control of actuation of important BOP functions in case of emergency.

Figure 4:
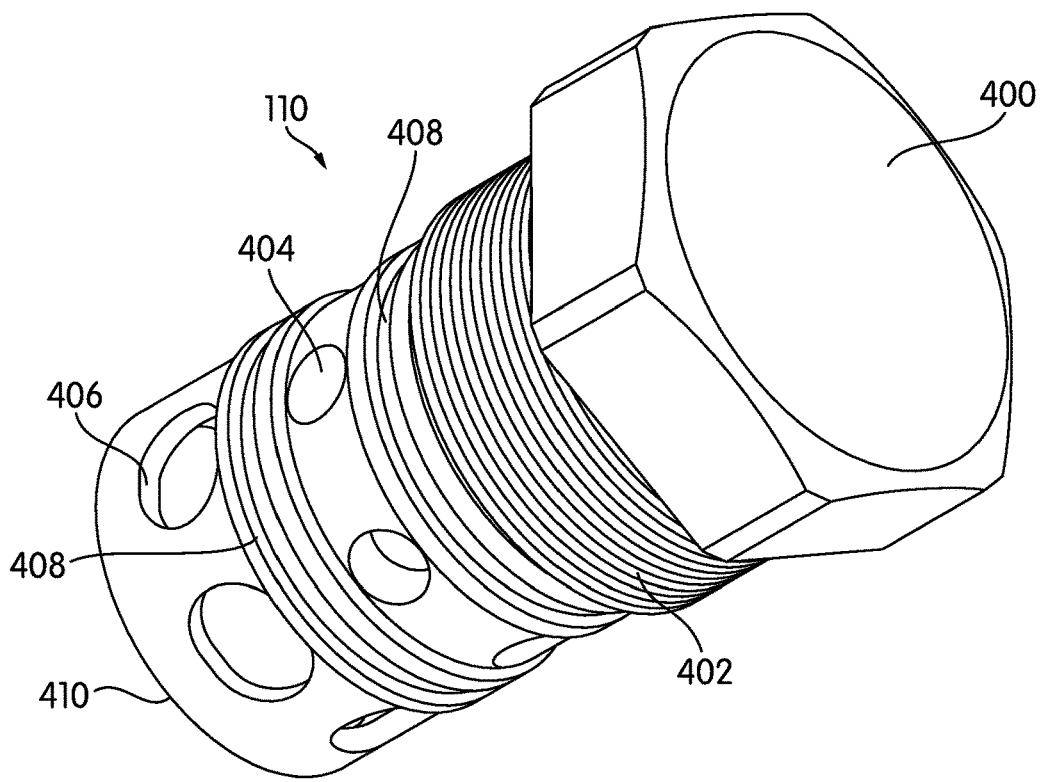
FIG. 4 is a perspective view of an upper sleeve for a valve, such as the valve shown in FIG. 1, according to an exemplary embodiment.
Figure 5:
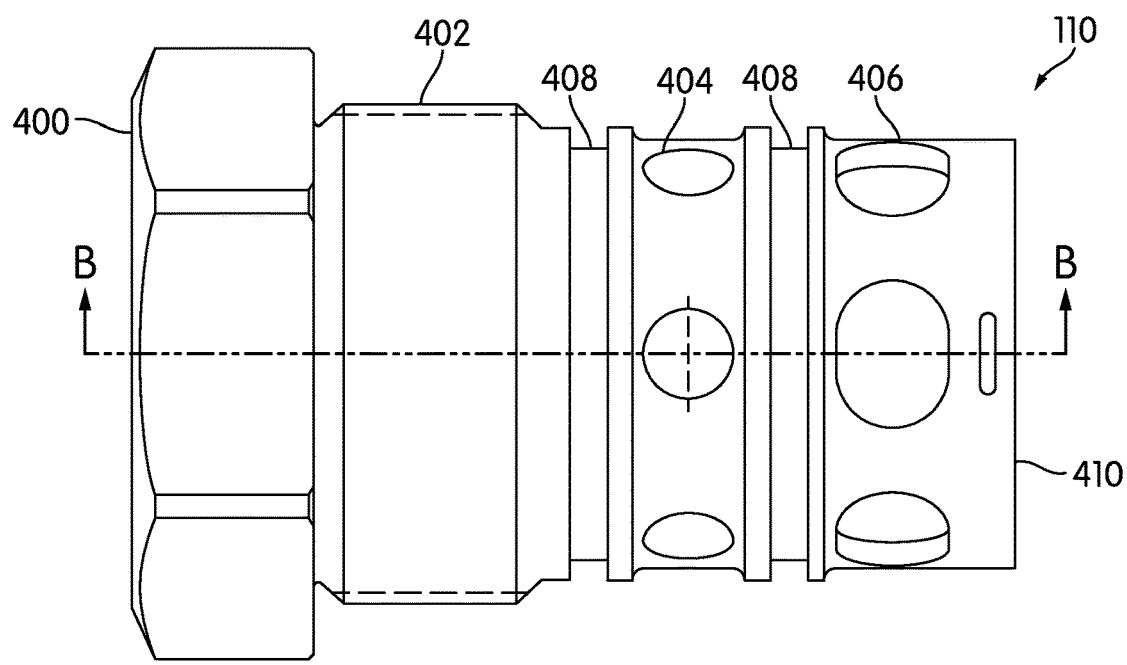
FIG. 5 is a side view of the upper sleeve shown in FIG. 4.
Figure 6:
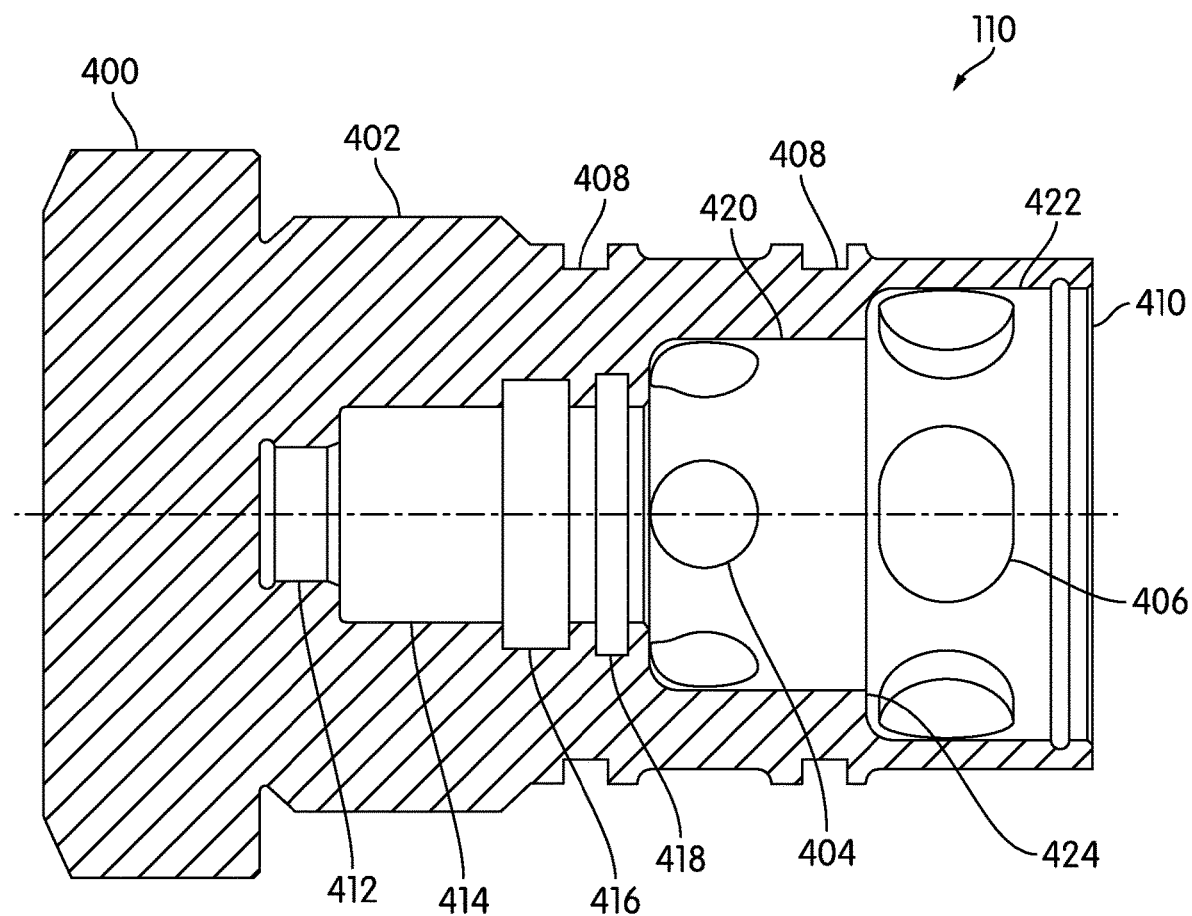
FIG. 6 is a cross-sectional view of the upper sleeve shown in FIG. 5 about plane B-B.

As shown in FIGS. 4-6, various aspects of upper sleeve 110 are shown in detail. Upper sleeve 110 may be a single unitary body having several components therein or may include multiple separate components attached together. According to various embodiments, upper sleeve 110 includes a first interface, shown as head 400 (e.g., external interface, etc.), and a second interface, shown as threaded portion 402 (e.g., internal interface, etc.). Head 400 and threaded portion 402 may cooperate to secure valve assembly 100 to a structure. In one application, head 400 and threaded portion 402 cooperate to secure valve assembly 100 to a sub-plate. Head 400 may be configured to interface with a tool (e.g., wrench, socket, screwdriver, etc.) such that threaded portion 402 may be rotated (e.g., threaded, etc.) into the structure. In an alternative embodiment, upper sleeve 110 does not include threaded portion 402. In this embodiment, valve assembly 100 may be inserted (e.g., bolted, etc.) into a structure rather than rotated into the structure.

According to an exemplary embodiment, upper sleeve 110 includes a first hole, shown as vent port 404, and a second hole, shown as working port 406. Vent port 404 and working port 406 are each configured to separately couple to a fluid connection (e.g., the first fluid connection, the second fluid connection, the third fluid connection, etc.). For example, working port 406 may transmit hydraulic fluid to the second fluid connection and vent port 404 may transmit hydraulic fluid to the third fluid connection. Depending on the application, upper sleeve 110 may include a plurality of vent ports 404 and/or a plurality of working ports 406. In these cases, the plurality of vent ports 404 and/or the plurality of working ports 406 may be uniformly distributed along the perimeter of upper sleeve 110. The shape, size, and configuration of vent port 404 may be collectively or individually varied such that valve assembly 100 is tailored for a target application. Similarly, the shape, size, and configuration of working port 406 may be collectively or individually varied such that valve assembly 100 is tailored for a target application.

In one embodiment, upper sleeve 110 includes a plurality of channels 408 which may be configured to receive seals (e.g., O-rings, etc.) or bushings (e.g., isolators, etc.). According to an exemplary embodiment, upper sleeve 110 includes channel 408 formed on the exterior surface thereof and located between vent port 404 and working port 406 such that fluid exiting vent port 404 is substantially prevented from entering vent port 404 and/or a fluid connection coupled to vent port 404 by a seal received in channel 408. Similarly, upper sleeve 110 may include a channel located between vent port 404 and threaded portion 402 such that fluid from vent port 404 is substantially prevented from encountering threaded portion 402 by a seal received in the channel. However, in some alternative applications, channels 408 do not receive seals and are instead configured to provide sealing forces independent of a seal.

Upper sleeve 110 includes an opening, shown as central opening 410. Central opening 410 is configured to receive lower sleeve 120 and poppet 130. FIG. 6 is a cross-sectional view of upper sleeve 110 taken along line B-B shown in FIG. 5. As shown in FIG. 6, an interior of upper sleeve 110 is defined by a series of interior sections having various diameters. In an exemplary embodiment, upper sleeve 110 includes a first section, shown as cushion receiver 412. Cushion receiver 412 is configured to receive a cushion plug that will provide resistance to movement of poppet 130. In some applications upper sleeve 110 does not utilize a cushion plug and therefore does not include cushion receiver 412. Upper sleeve 110 may also include a second section, shown as poppet receiver 414. Poppet receiver 414 is configured to receive poppet 130 and/or a spring of poppet 130. For example, poppet receiver 414 may facilitate receiving of a spring of poppet 130 around a cushion plug received in cushion receiver 412.

Upper sleeve 110 also may include a first channel, shown as first annular channel 416, and a second channel, shown as second annular channel 418. Both of first annular channel 416 and second annular channel 418 are configured to individually receive O-rings, seals, bushings, and other similar components. First annular channel 416 and second annular channel 418 may receive different O-rings, seals, bushings, and other similar components. For example, first annular channel 416 may receive a Teflon™ O-ring and second annular channel 418 may receive a butadiene O-ring.

According to various embodiments, upper sleeve 110 includes a first compartment, shown as vent compartment 420, and a second compartment, shown as working compartment 422. Vent compartment 420 is defined by a first diameter and working compartment 422 is defined by a second diameter greater than the first diameter. Additionally, vent compartment 420 may be defined by a first length and working compartment 422 may be defined by a second length less than the first length. However, in some embodiments, the second length is equal to or greater than the first length. In an exemplary embodiment, vent compartment 420 is configured to receive hydraulic fluid and vent the hydraulic fluid to a body of water (e.g., ocean, sea, lake, reservoir, etc.). According to one alternative embodiment, working compartment 422 includes a threaded interface configured to interface with lower sleeve 120 to couple upper sleeve 110 to lower sleeve 120. For example, lower sleeve 120 may be threaded into upper sleeve 110.

Vent compartment 420 and working compartment 422 are separated by a flange, shown as flange 424. Flange 424 extends around vent compartment 420 and is defined by the difference in diameter between vent compartment 420 and working compartment 422. Flange 424 is configured to interface with poppet 130 to selectively route hydraulic fluid through valve assembly 100.

Figure 7:
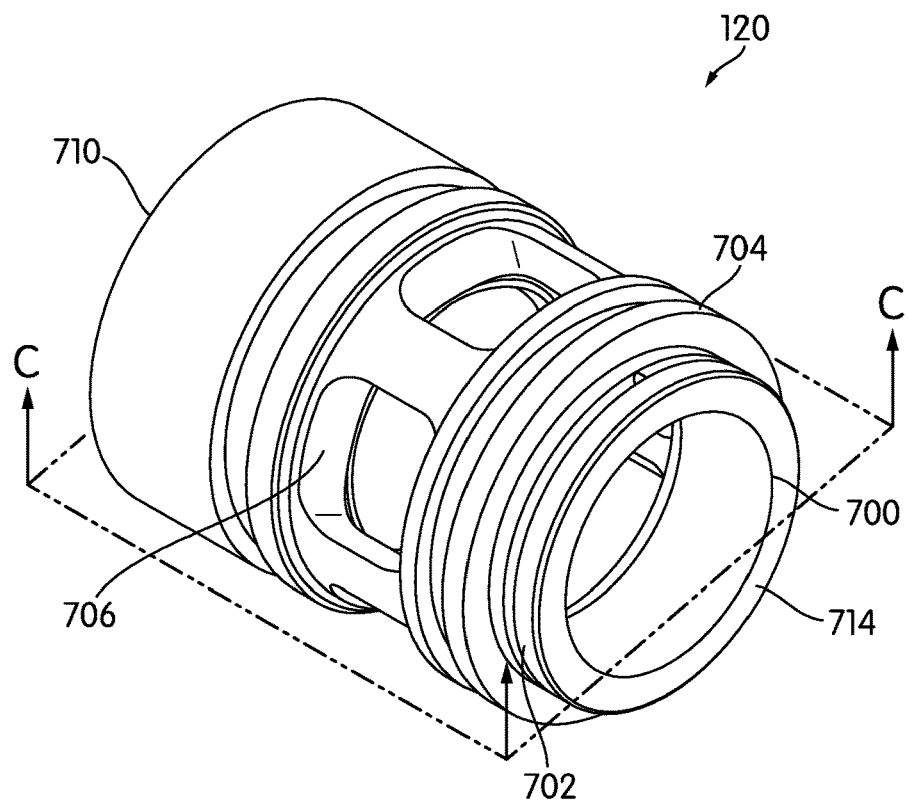
FIG. 7 is a perspective view of a lower sleeve for a valve, such as the valve shown in FIG. 1, according to an exemplary embodiment.
Figure 8:
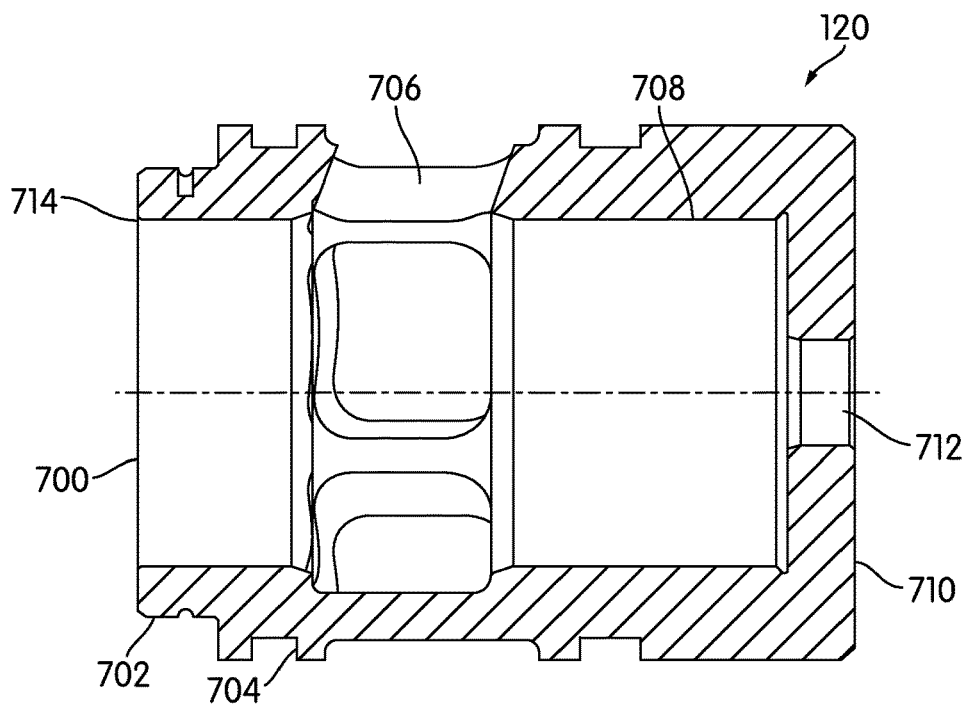
FIG. 8 is a cross-sectional view of the lower sleeve shown in FIG. 7 about plane C-C.

Referring to FIGS. 7 and 8, various aspects of lower sleeve 120 are shown in detail. Lower sleeve 120 may be a single unitary body having several components therein or may include multiple separate components attached together. Lower sleeve 120 includes an opening, shown as central opening 700. Central opening 700 is configured to receive poppet 130 and to be received in central opening 410, preferably, telescopically received in the central opening 410. According to various embodiments, lower sleeve 120 includes an interface, shown as mating surface 702 (e.g., external interface, etc.). Mating surface 702 is configured to be received in central opening 410 of upper sleeve 110. In some alternative embodiments, mating surface 702 includes a threaded interface configured to interface with upper sleeve 110 to couple upper sleeve 110 to lower sleeve 120. A threaded interface on mating surface 702 may mate with a threaded interface on central opening 410. In one example, mating surface 702 is configured to thread into working compartment 422.

Lower sleeve 120 may include a channel, shown as annular channel 704. Annular channel 704 is configured to receive O-rings, seals, bushings, and other similar components. For example, annular channel 704 may receive a Teflon™ O-ring or a butadiene O-ring. Similar to the seal received in channel 408, a seal received in annular channel 704 may be configured to substantially prevent undesirably fluid flow from, for example, vent port 404 or working port 406.

According to an exemplary embodiment, lower sleeve 120 includes a hole, shown as supply port 706. Supply port 706 is configured to couple to a fluid connection (e.g., the first fluid connection, the second fluid connection, the third fluid connection, etc.). For example, supply port 706 may receive hydraulic fluid from a hydraulic fluid supply. Further, supply port 706 may be configured to selectively supply hydraulic fluid to working port 406. Depending on the application, lower sleeve 120 may include a plurality of supply ports 706. In these cases, the plurality of supply ports 706 may be uniformly distributed along the perimeter of lower sleeve 120. The shape, size, and configuration of supply port 706 may be collectively or individually varied such that valve assembly 100 is tailored for a target application. In one embodiment, a seal received in annular channel 704 substantially prevents fluid flow from vent port 404 or working port 406 from entering supply port 706. Similarly, in another embodiment, a seal received in annular channel 704 substantially prevents fluid flow from supply port 706 from entering vent port 404 or working port 406.

Lower sleeve 120 includes a section opposite central opening 700, shown as poppet chamber 708. FIG. 8 is a cross-sectional view of lower sleeve 120 taken along plane C-C shown in FIG. 7. Poppet 130 is moveable within poppet chamber 708. Poppet chamber 708 is defined, in part, by a wall, shown as bottom face 710 (e.g., annular wall, etc.). Bottom face 710 is configured to retain poppet 130 within valve assembly 100. Bottom face 710 includes a hole, shown as pilot port 712. According to an exemplary embodiment, pilot port 712 is centered on bottom face 710. Pilot port 712 is configured to selectively receive a portion of poppet 130. Pilot port 712 is configured to receive hydraulic fluid and to provide hydraulic fluid to lower sleeve 120. In some alternative embodiments, lower sleeve 120 does not include bottom face 710. In these embodiments, the diameter of pilot port 712 is essentially equal to the inner diameter of lower sleeve 120.

Central opening 700 defines an edge, shown as edge 714. Edge 714 extends around central opening 700. Edge 714 is defined by the difference between the diameter of central opening 700 and mating surface 702. Edge 714 is configured to interface with poppet 130 to selectively route hydraulic fluid through valve assembly 100.

Figure 9:
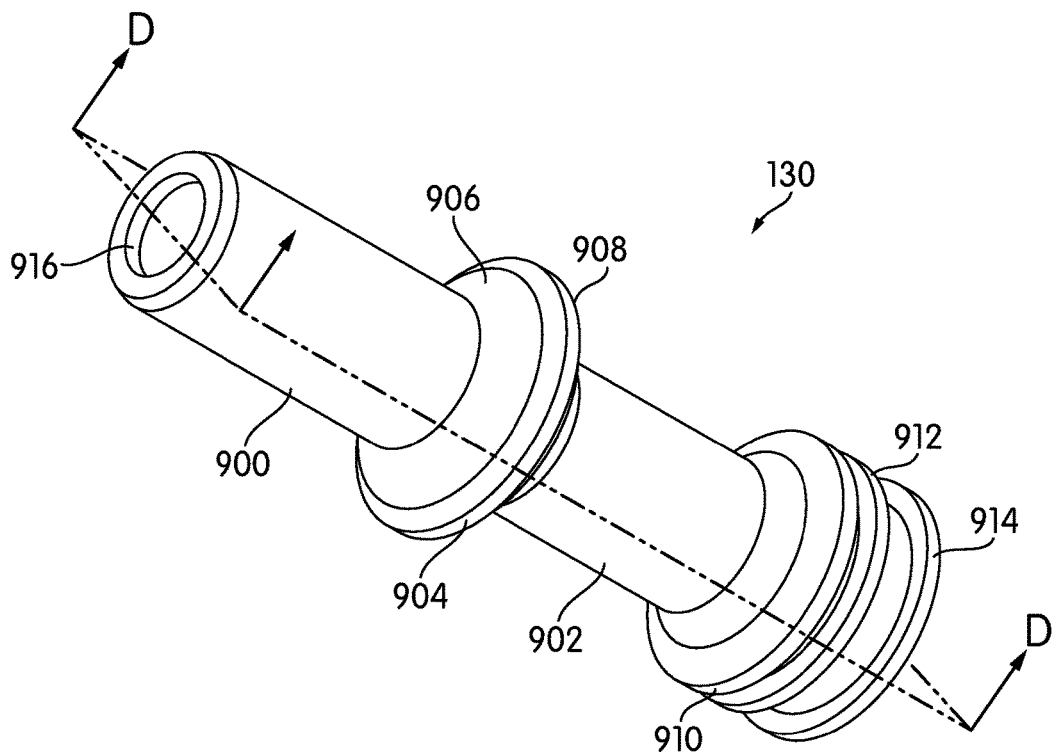
FIG. 9 is a perspective view of a poppet for a valve, such as the valve shown in FIG. 1, according to an exemplary embodiment.
Figure 10:
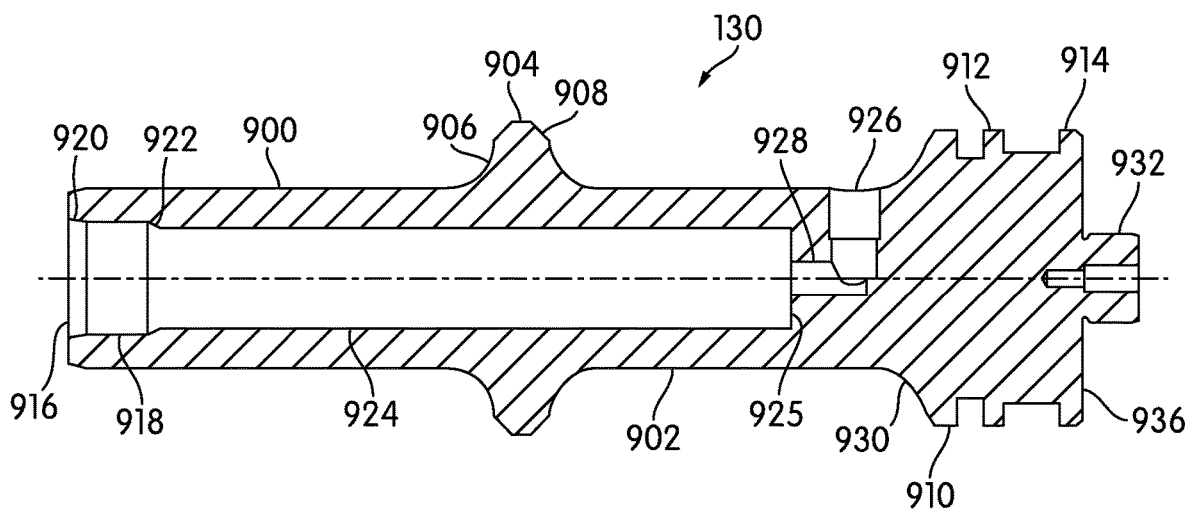
FIG. 10 is a cross-sectional view of the poppet shown in FIG. 9 about plane D-D.

As shown in FIGS. 9 and 10, various aspects of poppet 130 are described in detail. Poppet 130 may be a single unitary body having several components therein or may include multiple separate components assembled or attached to one another. Poppet 130 includes a first portion, shown as first cylindrical portion 900, and a second portion, shown as second cylindrical portion 902. First cylindrical portion 900 and second cylindrical portion 902 are configured to be received, preferably telescopically received, in central opening 410 and central opening 700. Further, first cylindrical portion 900 and second cylindrical portion 902 are configured to be received in vent compartment 420 and working compartment 422. In an exemplar embodiment, first cylindrical portion 900 and second cylindrical portion 902 have the same diameter. According to various embodiments, first cylindrical portion 900 is configured to be received in poppet receiver 414. Similarly, second cylindrical portion 902 is configured to be received in poppet chamber 708.

In an exemplary embodiment, first cylindrical portion 900 and second cylindrical portion 902 are separated by an intermediate portion, shown as intermediate portion 904. Intermediate portion radially protrudes from poppet 130 between first cylindrical portion 900 and second cylindrical portion 902. Intermediate portion 904 includes a first side, shown as vent surface 906, and a second side, shown as supply surface 908. In one embodiment, intermediate portion 904 is symmetrical so that vent surface 906 is substantially congruent to supply surface 908.

Intermediate portion 904 is configured to interface with flange 424 in upper sleeve 110 and edge 714 in lower sleeve 120 to selectively route hydraulic fluid from supply port 706 to working port 406. For example, when vent surface 906 is in contact with flange 424 in upper sleeve 110, valve assembly 100 may be in the second position (e.g., open position) such that hydraulic fluid may flow from supply port 706 to working port 406 while working port 406 and vent port 404 are not in communication. In another example, when supply surface 908 is in contact with edge 714 in lower sleeve 120, valve assembly 100 may be in the first position (e.g., closed position) such that hydraulic fluid is prohibited from flowing from supply port 706 to working port 406 while working port 406 and vent port 404 are in communication.

Poppet 130 also includes a terminal portion, shown as lower portion 910. Lower portion 910 is coupled to second cylindrical portion 902 and is disposed at one end of poppet 130. Lower portion 910 radially and axially protrudes from poppet 130. Lower portion 910 includes a first channel, shown as first annular channel 912, and a second channel, shown as second annular channel 914. Both of first annular channel 912 and second annular channel 914 are configured to individually receive O-rings, seals, bushings, and other similar components. However, the particular O-rings, seals, and bushings received in first annular channel 912 and second annular channel 914 may be different from one another. For example, first annular channel 912 may receive a Teflon™ O-ring and second annular channel 914 may receive a butadiene O-ring.

FIG. 10 is a cross-sectional view of poppet 130 taken along plane D-D shown in FIG. 9. According to various embodiments, poppet 130 is partially hollow and includes an opening, shown as central opening 916. In an exemplary embodiment, central opening 916 is disposed on poppet 130 opposite lower portion 910. In one embodiment, central opening 916 transitions into a portion, shown as receiving portion 918. Receiving portion 918 has a smaller diameter than central opening 916 and is positioned adjacent the central opening 916. Receiving portion 918 may be configured to selectively receive a component of valve assembly 100, such as a plug (e.g., cushion plug, etc.).

Receiving portion 918 may include a first face or shoulder, shown as outer face 920, which is in confronting relation with central opening 916, and a second face or shoulder, shown as inner face 922, opposite outer face 920. Outer face 920 may be tapered, chamfered, beveled, or otherwise formed to facilitate reception of a component of valve assembly 100 through central opening 916. Similarly, inner face 922 may be tapered, chamfered, beveled, or otherwise formed to match an edge of the received component of valve assembly 100. In one application, outer face 920 and inner face 922 are tapered to facilitate reception of a cushion plug of valve assembly 100, the cushion plug having an edge that is inserted through central opening 916 and into receiving portion 918 that is tapered to match inner face 922. In an alternative embodiment, receiving portion 918 has the same diameter as central opening 916 such that outer face 920 is not included in poppet 130 and central opening 916 directly abuts receiving portion 918. In such an alternative embodiment, inner face 922 may still be tapered.

According to various embodiments, inner face 922 transitions into a cavity, hollow, or opening, shown as central cavity 924. Central cavity 924 terminates at a base, shown as base 925, substantially opposite the inner face 922 and central opening 916. Base 925 is configured to interface with and abut one portion of a spring used to bias poppet 130. Similarly, base 925 is configured to interface with and resist the force from hydraulic fluid to bias poppet 130. According to various embodiments, base 925 is substantially parallel to central opening 916.

In some embodiments, central cavity 924 has a diameter that is less than the diameter of receiving portion 918. However, in other embodiments, central cavity 924 has a diameter that is equal to the diameter of receiving portion 918 such that inner face 922 is not included in poppet 130 and central cavity 924 extends from receiving portion 918 to base 925. Central cavity 924 extends into poppet 130 a distance. This distance may be related to a particular length of a spring (e.g., compressed spring length, uncompressed spring length, etc.) incorporated in valve assembly 100. Central cavity 924 may be of uniform diameter along the length of central cavity 924. However, in alternative embodiments, central cavity 924 is tapered, threaded, slanted, or otherwise formed.

In an exemplary embodiment, poppet 130 includes a hole formed in the sidewall, shown as hydraulic port 926. In use, hydraulic port 926 receives hydraulic fluid from supply port 706. According to various embodiments, hydraulic port 926 is formed to include a flow restricting orifice that restricts flow of the hydraulic fluid. For example, hydraulic port 926 may utilize a specifically sized drilling that acts as a flow restricting orifice. According to other embodiments, hydraulic port 926 receives a flow restricting orifice that is inserted in and coupled to hydraulic port 926. In these embodiments, the flow restricting orifice may be a commercially available off-the-shelf (COTS) component. In an exemplary embodiment, hydraulic port 926 restricts flow entering central cavity 924 and flow leaving central cavity 924. In this way, hydraulic port 926 may be tailored to provide a desired flow restriction on the flow of hydraulic fluid received from supply port 706. The shape, size, and configuration of the flow restricting orifice either incorporated or inserted in hydraulic port 926 is selected based on the size of valve assembly 100, a range of working pressures, and a desired flow rate. For example, hydraulic port 926 may receive hydraulic fluid from supply port 706 at a first flow rate and may provide hydraulic fluid to central cavity 924 at a second flow rate lower than the first flow rate.

Hydraulic port 926 is fluidly coupled to central cavity 924 via a channel, shown as connecting channel 928. In this way, hydraulic fluid may be supplied from supply port 706 to hydraulic port 926, through connecting channel 928, into central cavity 924, through receiving portion 918, and out central opening 916. The diameter of hydraulic port 926, connecting channel 928, central cavity 924, receiving portion 918, and central opening 916 determines the pressure and flow rate of fluid exiting central opening 916. For example, the diameter of hydraulic port 926 and connecting channel 928 may be selected to provide a target flow rate of fluid from central opening 916.

According to one embodiment, hydraulic port 926 is a single hole in poppet 130. However, in alternative embodiments, poppet 130 includes multiple hydraulic ports 926 connected to connecting channel 928. For example, poppet 130 may include two hydraulic ports 926 on opposite sides of poppet 130. Further, poppet 130 may not include connecting channel 928. Rather, hydraulic port 926 may be directly fluidly coupled to central cavity 924. When constructed, connecting channel 928 may be integrated into central cavity 924. For example, central cavity 924 may gradually taper into connecting channel 928.

Lower portion 910 includes a surface, shown as lower surface 930. Lower surface 930 is configured to provide a seal between lower portion 910 and lower sleeve 120. According to various embodiments, lower surface 930 is configured to be substantially congruent to supply surface 908. In this way, the area of lower surface 930 may be thought of as substantially equal to the area of supply surface 908. Because of their equal areas, pressure forces from hydraulic fluid on lower surface 930 and supply surface 908 may be substantially equal and therefore essentially balance each other out.

In an exemplary embodiment, hydraulic port 926 is located proximate lower surface 930. However, in other embodiments, hydraulic port is located proximate supply surface 908. In one embodiment, hydraulic port 926 is located to be an equal distance from lower surface 930 and supply surface 908.

According to various embodiments, poppet 130 further includes a protrusion, shown as pilot extension 932 opposite central opening 916. In some embodiments, pilot extension 932 is configured to be centered about a central axis of poppet 130 and pilot extension 932 is configured to protrude from poppet 130. In one embodiment, pilot extension 932 is substantially cylindrical. In other embodiments, pilot extension 932 is rectangular, hexagonal, or otherwise shaped. Similarly, pilot extension 932 may be rounded, filleted, or chamfered.

Pilot extension 932 may extend from a surface, shown as pilot surface 936. Pilot surface 936 is configured to have a perimeter that matches or closely approximates that of poppet chamber 708. For example, if poppet chamber 708 is cylindrical, pilot surface 936 is cylindrical. A difference between pilot surface 936 and poppet chamber 708 may be used as a clearance to facilitate movement of hydraulic fluid when poppet 130 is transitioning between the first position and the second position. Similarly, this difference may facilitate inflow of hydraulic fluid into poppet chamber 708 when hydraulic fluid is introduced through pilot port 712. Pilot surface 936 is configured such that substantially no gap exists between pilot surface 936 and poppet chamber 708. In this way, hydraulic fluid that enters poppet chamber 708 is substantially prevented from leaking past first annular channel 912 and second annular channel 914. When hydraulic fluid enters poppet chamber 708, the hydraulic fluid contacts pilot surface 936. In this way, pilot surface 936, which is larger than central opening 916, provides a greater resistance on poppet 130 than hydraulic fluid can impose on through central opening 916. According to an exemplary embodiment, base 925 is substantially parallel to pilot surface 936, but it is not required that base 925 and pilot surface 936 be substantially parallel.

Figure 11:
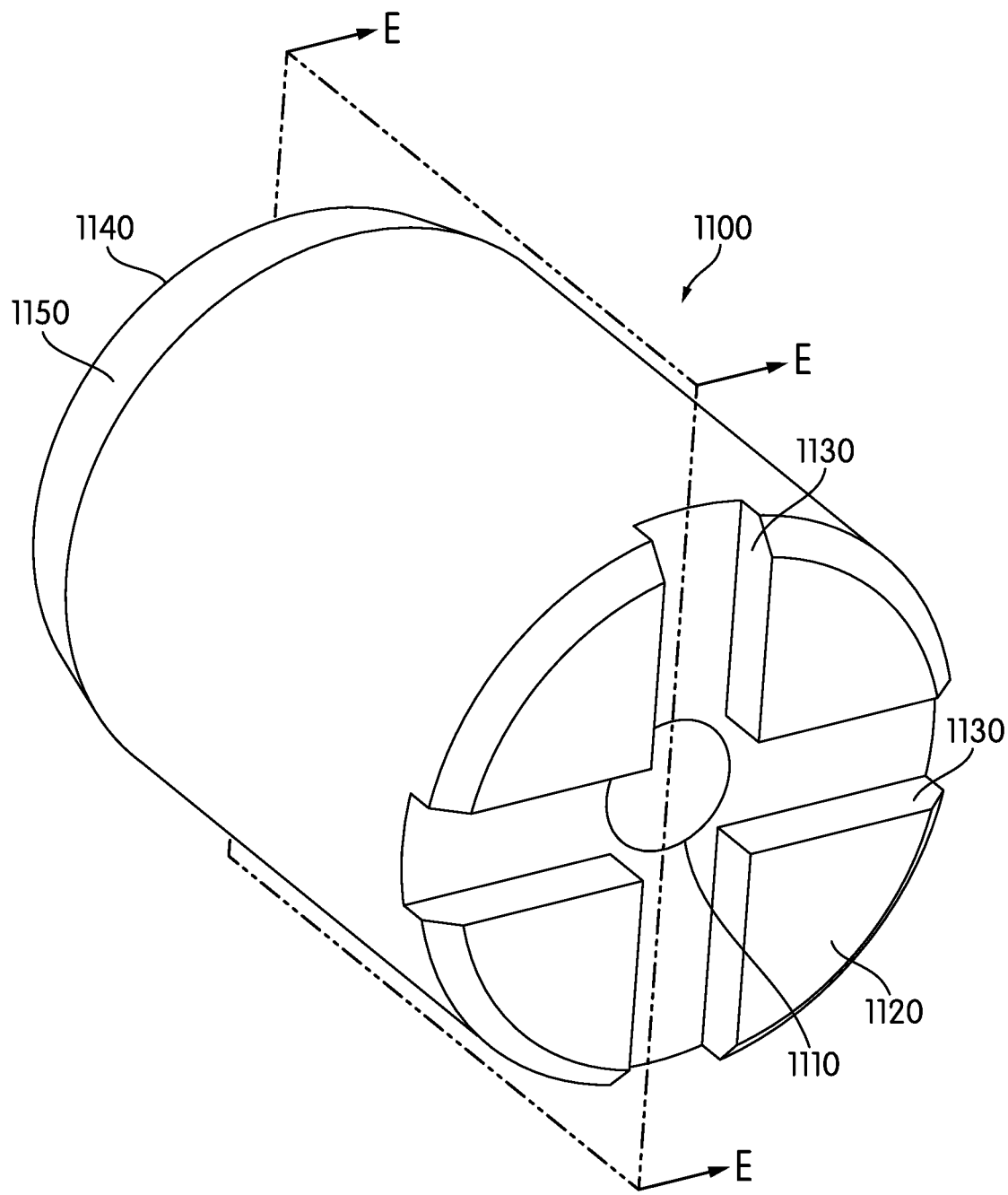
FIG. 11 is a perspective view of a cushion plug for a valve, such as the valve shown in FIG. 1, according to an exemplary embodiment.
Figure 12:
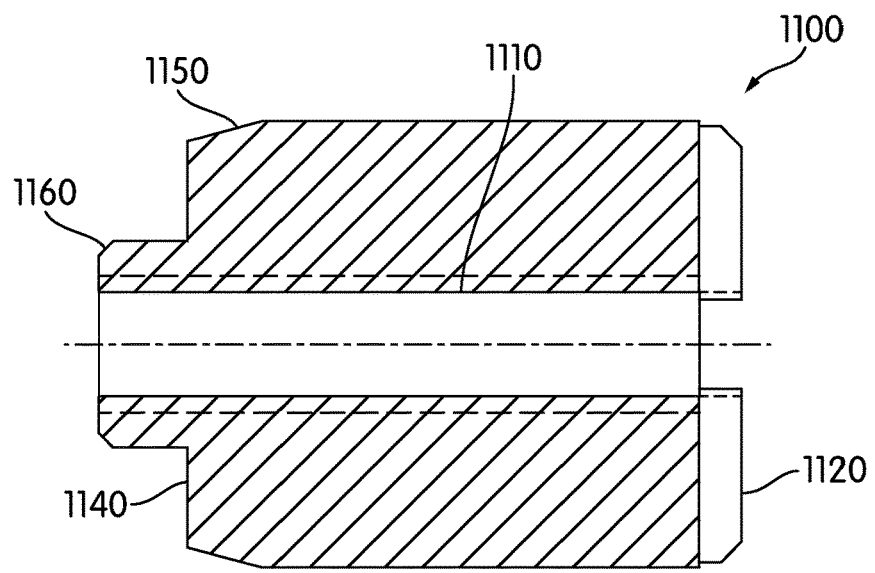
FIG. 12 is a cross-sectional view of the cushion plug shown in FIG. 11 about plane E-E.
Figure 13:
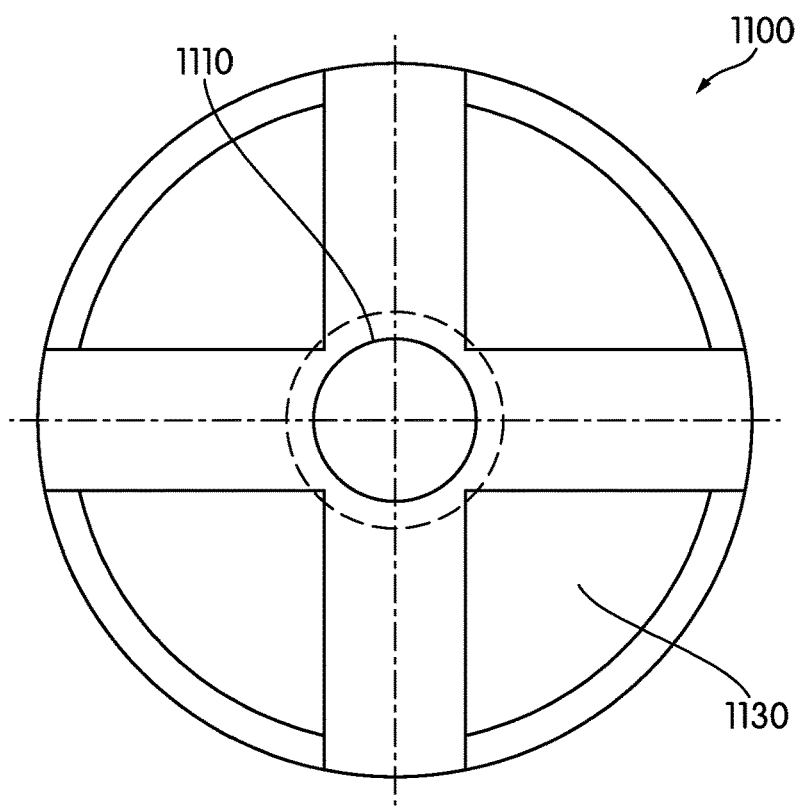
FIG. 13 is a front view of the cushion plug shown in FIG. 11.

Referring now to FIGS. 11-13, various aspects of a plug, shown as cushion plug 1100, for a valve assembly, such as valve assembly 100, are shown and described in detail. Cushion plug is configured to be received in cushion receiver 412 in upper sleeve 110 and in central opening 916 and/or receiving portion 918 of poppet 130. Cushion plug 1100 includes a hole, shown as bore 1110. According to an exemplary embodiment, bore 1110 is centered on a central axis of cushion plug 1100. Cushion plug 1100 includes a face, shown as sleeve face 1120. Sleeve face 1120 is configured to be in confronting relation with cushion receiver 412 when cushion plug 1100 is inserted in cushion receiver 412.

In some applications, sleeve face 1120 contains slots, shown as venting slots 1130. Venting slots 1130 are configured to receive fluid or air from cushion receiver 412 when cushion plug 1100 is inserted in cushion receiver 412. Further, the fluid or air can exit cushion plug 1100 through bore 1110. In some embodiments, an edge of sleeve face 1120 is beveled or chamfered.

Cushion plug 1100 also includes another face, opposite sleeve face 1120, shown as poppet face 1140. Poppet face 1140 is configured to be in confronting relation with receiving portion 918 of poppet 130 when poppet 130 interfaces with cushion plug 1100. Cushion plug 1100 also includes another face, shown as beveled face 1150. Beveled face 1150 is configured to be substantially complementary to and mate with inner face 922 of receiving portion 918.

FIG. 12 is a cross-sectional view of cushion plug 1100 taken along plane E-E shown in FIG. 11. Cushion plug 1100 also includes a protrusion, shown as centering protrusion 1160, that protrudes axially from cushion plug 1100. Centering protrusion 1160 is configured to be centered on the central axis of cushion plug 1100. According to various embodiments, centering protrusion 1160 is defined by a diameter smaller than a diameter of cushion plug 1100. Centering protrusion 1160 is configured to be received in a spring of valve assembly 100. For example, the diameter of centering protrusion 1160 may be selected to fit within an inner diameter of a spring of valve assembly 100.

In some embodiments, bore 1110 extends through cushion plug 1100 and centering protrusion 1160. In other embodiments, bore 1110 only extends partially into cushion plug 1100. In still other embodiments, cushion plug 1100 does not include bore 1110. Further, centering protrusion 1160 may protrude from cushion plug 1100 by varying amounts depending on the application. In one embodiment, cushion plug 1100 and centering protrusion 1160 are substantially cylindrical. In other embodiments, cushion plug 1100 and/or centering protrusion 1160 are rectangular, hexagonal, or otherwise shaped. Similarly, cushion plug 1100 and centering protrusion 1160 may be rounded, filleted, or chamfered.

Figure 14:
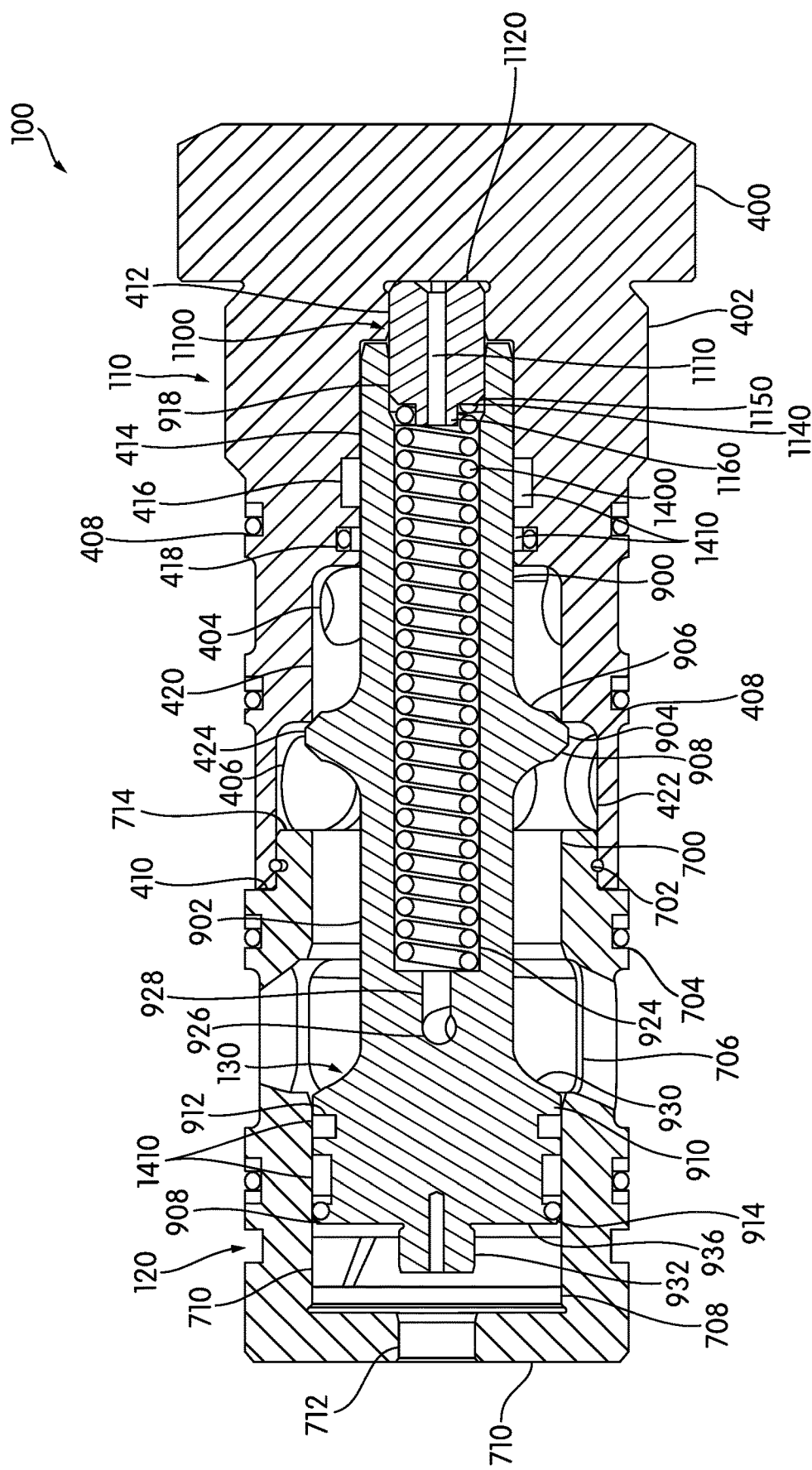
FIG. 14 is a cross-sectional view of the valve shown in FIG. 2 about plane A-A in a second position.

Referring now to FIG. 14, valve assembly 100 is shown in the second position (e.g., open position). Valve assembly 100 is shown to include a spring, shown as spring 1400. Spring 1400 is located in central cavity 924 of poppet 130. Further, spring 1400 is positioned over centering protrusion 1160 of cushion plug 1100. Movement of poppet 130 towards head 400 is resisted by spring force created by an interaction between spring 1400, central cavity 924, and cushion plug 1100. Similarly, movement of poppet 130 away from head 400 may be assisted by spring force created by an interaction between spring 1400, central cavity 924, and cushion plug 1100.

According to an exemplary operation where valve assembly 100 begins in the first position (e.g., closed position) as shown in, for example, FIG. 3, hydraulic fluid is supplied to poppet 130 through supply port 706. While in the first position, flow of the hydraulic fluid from supply port 706 is blocked from working port 406 by poppet 130 when poppet 130 is in the first position. This is because in the first position, supply surface 908 is in contact with edge 714.

According to one embodiment, intermediate portion 904 and edge 714 are both constructed from metallic material. Accordingly, in this embodiment, the seal formed in the first position between supply surface 908 and edge 714 is a metal-on-metal seal.

Hydraulic fluid that flows through supply port 706 creates a substantially equal force on supply surface 908 as on lower surface 930, thereby creating substantially balanced forces on poppet 130. Further, hydraulic fluid flows from supply port 706 into hydraulic port 926 and then into central cavity 924 and finally towards poppet receiver 414. Hydraulic fluid builds up in central cavity 924 and poppet receiver 414 and provides an additional biasing force on poppet 130 that maintains poppet 130 in the first position. According to an exemplary embodiment, poppet receiver 414 cooperates with central cavity 924 to accumulate hydraulic fluid. In an alternative embodiment, hydraulic fluid is only accumulated in central cavity 924. When poppet 130 is in the first position, hydraulic fluid may fill central cavity 924 and poppet receiver 414. In the first position as shown in, for example, FIG. 3, spring 1400 biases poppet 130 to prevent leakage between supply port 706 and working port 406. This bias is a function of the amount of hydraulic fluid in central cavity 924 and/or poppet receiver 414. Accordingly, the bias to poppet 130 provided by hydraulic fluid in central cavity 924 and/or poppet receiver 414 may be applied gradually.

When valve assembly 100 is transitioned from the first position (e.g., closed position) as shown in, for example, FIG. 3, to the second position (e.g., open position) as shown in, for example, FIG. 14, for example by a controller opening valve assembly 100, hydraulic fluid is caused to flow through pilot port 712 thereby contacting pilot extension 932 and pilot surface 936. The hydraulic fluid introduced through pilot port 712 may be introduced at supply port pressure (i.e., the same pressure as hydraulic fluid from supply port 706). The hydraulic fluid introduced through pilot port 712 biases poppet 130 towards head 400 through a force created on a combination of pilot extension 932 and pilot surface 936 that overcomes forces from the hydraulic fluid that would otherwise bias poppet 130 towards the first position.

As pressure from the hydraulic fluid on pilot surface 936 increases, poppet 130 is biased against spring force created by an interaction between spring 1400, central cavity 924, and centering protrusion 1160 as well as force from hydraulic fluid within central cavity 924. When spring 1400 compresses, spring force on poppet 130 increases thereby requiring greater and greater pressure of hydraulic fluid through pilot port 712 on pilot surface 936 to bias poppet 130.

As spring 1400 compresses, cushion plug 1100 enters central cavity 924 thereby decreasing volume available to the hydraulic fluid. This effect causes hydraulic fluid to be forced out of central cavity 924 and poppet receiver 414 through hydraulic port 926 thereby cushioning movement of poppet 130 towards the second position. This cushioning decelerates poppet 130 near the second position such that initial contact forces between vent surface 906 and flange 424 are minimized. In other words, the flow rate at which hydraulic fluid is expelled from hydraulic port 926 is related to a resistance to movement of poppet 130. The flow rate of hydraulic fluid leaving central cavity 924 is limited by hydraulic port 926. Hydraulic port 926 may be configured to provide a target flow restriction such that the transition time of poppet 130 from the first position to the second position occurs over a target transition duration.

When in the second position as shown in, for example, FIG. 14, vent surface 906 is in contact with flange 424 and a seal is created such that substantially no hydraulic fluid can pass from supply port 706 and/or working port 406 to vent port 404. According to one embodiment, intermediate portion 904 and flange 424 are both constructed from metallic material. Accordingly, in this embodiment, the seal formed in the second position between vent surface 906 and flange 424 is a metal-on-metal seal. In the second position, the force of hydraulic fluid on pilot surface 936 biases poppet 130 to prevent leakage to vent port 404.

To transition poppet 130 from the second position to the first position, the flow of hydraulic fluid through pilot port 712 to poppet chamber 708 and on pilot surface 936 is decreased. For example, pressure of hydraulic fluid supplied to supply port 706 and pilot port 712 may be decreased. This allows spring force from spring 1400 and an additional biasing force from hydraulic fluid filling central cavity 924 to overcome the force of hydraulic fluid on pilot surface 936 and bias poppet 130 towards the first position. The flow rate of hydraulic fluid filling central cavity 924 is limited by hydraulic port 926. Hydraulic port 926 may be configured to provide a target flow restriction such that the transition time of poppet 130 from the second position to the first position occurs over a target transition duration.

As poppet 130 transitions towards the first position, hydraulic fluid is forced out of pilot port 712. In particular, as poppet 130 nears the first position, the hydraulic fluid forced out of pilot port 712 cushions movement of poppet 130. This cushioning decelerates poppet 130 near the first position such that initial contact forces between supply surface 908 and edge 714 are minimized. In other words, the flow rate at which hydraulic fluid is expelled from pilot port 712 is related to a resistance to movement of poppet 130. When in the first position, supply surface 908 is in contact with edge 714 and a seal is created such that substantially no hydraulic fluid can pass from supply port 706 to vent port 404.

Through the use of poppet 130, valve assembly 100 is capable of achieving less leakage and higher maximum flow rates through working port 406 than similar conventional valves. Further, poppet 130 may facilitate faster shifting times between an open position and a closed position than exhibited by similar conventional valves. This is largely due to the magnitude of the forces created on pilot surface 936 and the forces created by spring 1400 and hydraulic fluid in central cavity 924. The magnitude of these forces also greatly reduces the likelihood that poppet 130 will become stuck between the first position and the second position unintentionally. The fast shifting times of poppet 130 allow valve assembly 100 to minimize the length of time during which supply port 706, working port 406, and vent port 404 are all connected. This may minimize the amount of fluid expelled through vent port 404.

Poppet 130 also may allow valve assembly 100 to have an increased life compared to similar conventional valves. For example, the interaction of hydraulic fluid in central cavity 924 and poppet receiver 414 between cushion plug 1100, hydraulic port 926, and connecting channel 928 as well as the interaction of hydraulic fluid in poppet chamber 708 between pilot surface 936, pilot extension 932 and pilot port 712 facilitate cushioning of movement of poppet 130 near the first position and the second position. This cushioning minimizes initial contact forces between intermediate portion 904 and upper sleeve 110 and lower sleeve 120 thereby decreasing the wear and tear and increasing the life of valve assembly 100. As an additional result of this cushioning, pressure spikes experienced within valve assembly 100 are minimized thereby increasing the life of valve assembly 100. In valve assembly 100, these contact forces are substantially below a required force to cause damage to metallic components. Further, the cushioning of poppet 130 allows valve assembly 100 to internally mitigate water-hammer thereby allowing valve assembly 100 to be quieter and more desirable than similar conventional valves which are not able to mitigate water-hammer or pressure spikes.

The specific location and order of pilot port 712, supply port 706, working port 406, and vent port 404, is not typically utilized in standard conventional valves. Without this specific layout of pilot port 712, supply port 706, working port 406, and vent port 404, valve assembly 100 may not display the same hydraulic cushioning near the first position and near the second portion, rapid switching between the first position and the second position, and leakage prevention at the first position and at the second position.

Further, valve assembly 100 also includes several support members, shown as wear bands 1410 (e.g., wear rings, guide rings, etc.). Wear bands 1410 are configured to maintain a position of poppet 130 through operation of valve assembly 100 and between the first position and second position. Wear bands 1410 may prevent or eliminate misalignment of poppet 130 thereby increasing reliability of valve assembly 100 compared to standard conventional valves which do not incorporate wear bands and instead are subject to metal-on-metal sliding contact.

In an alternative embodiment, hydraulic port 926 only restricts flow of hydraulic fluid entering central cavity 924. In another alternative embodiment, hydraulic port 926 only restricts flow of hydraulic fluid leaving central cavity 924. In yet another alternative embodiment, hydraulic port 926 restricts flow of hydraulic fluid entering central cavity 924 at a first rate and restricts flow of hydraulic fluid leaving central cavity 924 at a second rate different from the first rate. Further, hydraulic port 926 may utilize a variable flow restricting orifice that can be controllably varied by a controller. Hydraulic port 926 may not utilize a flow restricting orifice. Rather, the flow rate may be restricted by the size, shape, and configuration of hydraulic port 926 and/or connecting channel 928. In one alternative embodiment, valve assembly 100 may not include spring 1400 while still including central cavity 924. In this way, supply pressure may still be applied to poppet 130 to aid in shifting between the first position and the second position.

In some embodiments, vent port 404 must be unobstructed. Valve assembly 100 may provide an amount on the order of two-thousand and six-hundred liters per minute of hydraulic fluid to working port 406. Valve assembly 100 may provide higher flow rates than similar conventional valves because valve assembly 100 is capable of overcoming flow forces which typically close similar conventional valves. Valve assembly 100 may be defined by a diameter of threaded portion 402 or by a diameter of another portion of upper sleeve 110 or lower sleeve 120. In some examples, threaded portion 402 has a diameter of between 2.54 centimeters to 3.81 centimeters. In other examples, threaded portion 402 may have a diameter greater than 3.81 centimeters or smaller than 2.54 centimeters.

Figure 15:
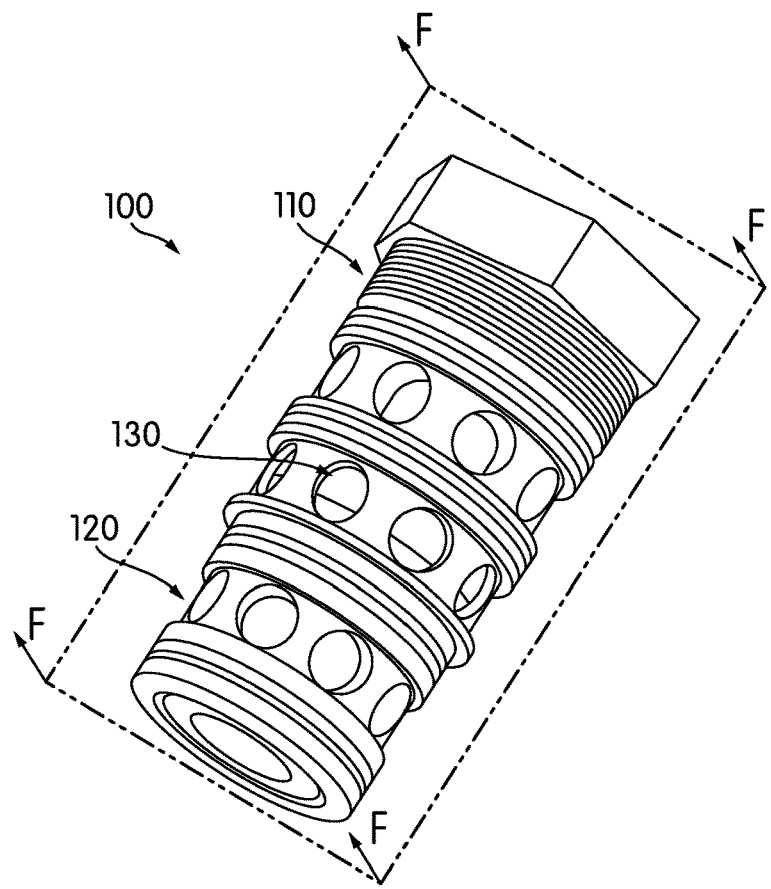
FIG. 15 is a prospective view of a valve having a second configuration, according to an exemplary embodiment.
Figure 16:
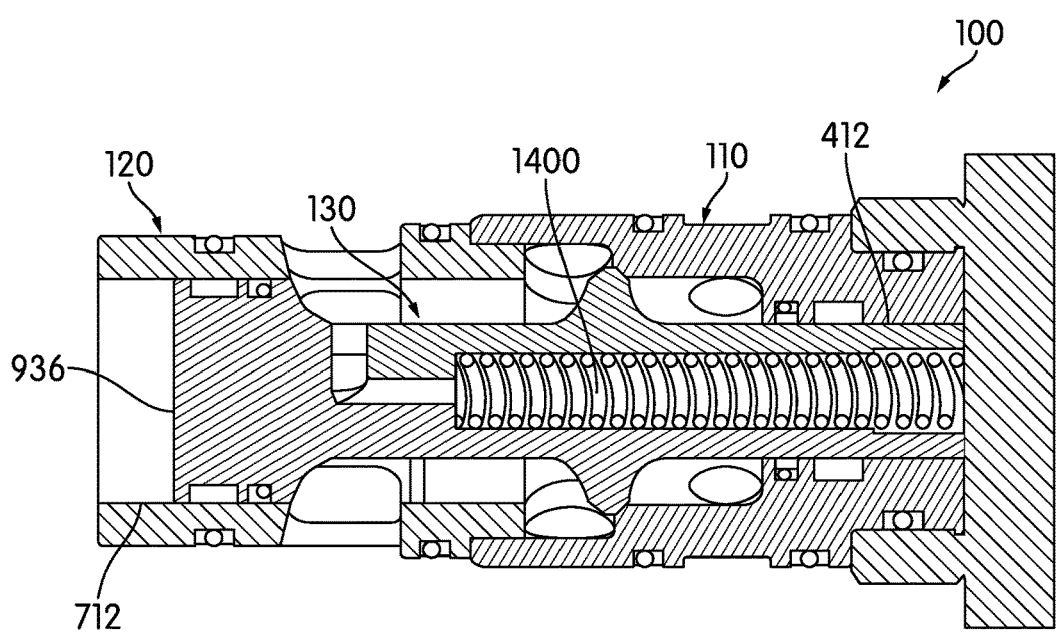
FIG. 16 is a cross-sectional view of the valve shown in FIG. 15, in a first configuration, about plane F-F in a second position.
Figure 17:
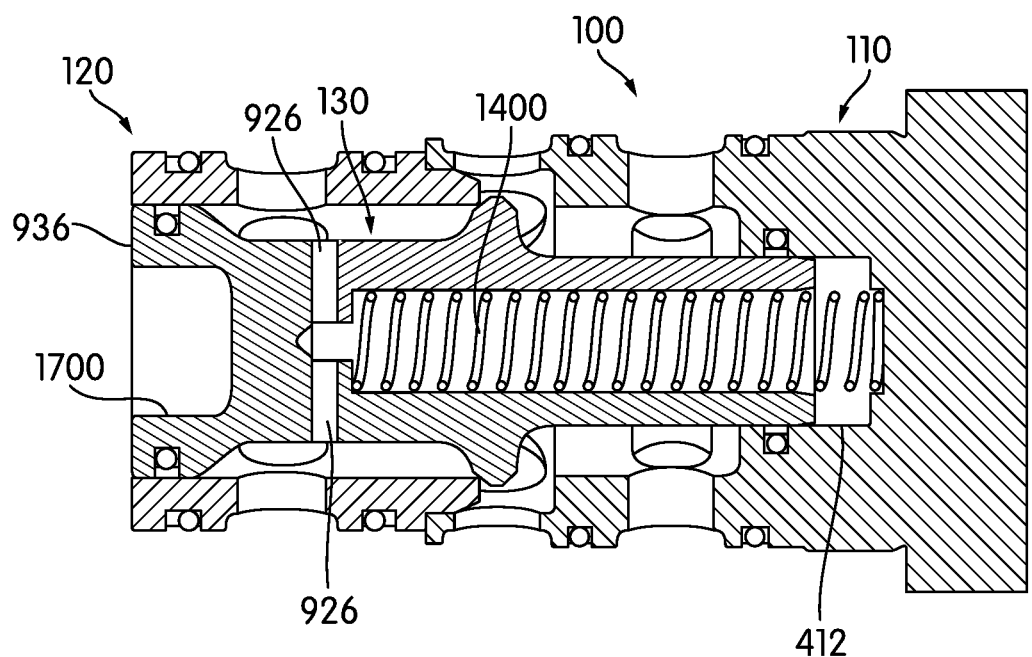
FIG. 17 is a cross-sectional view of the valve shown in FIG. 15, in a second configuration, about plane F-F in a first position.
Figure 18:
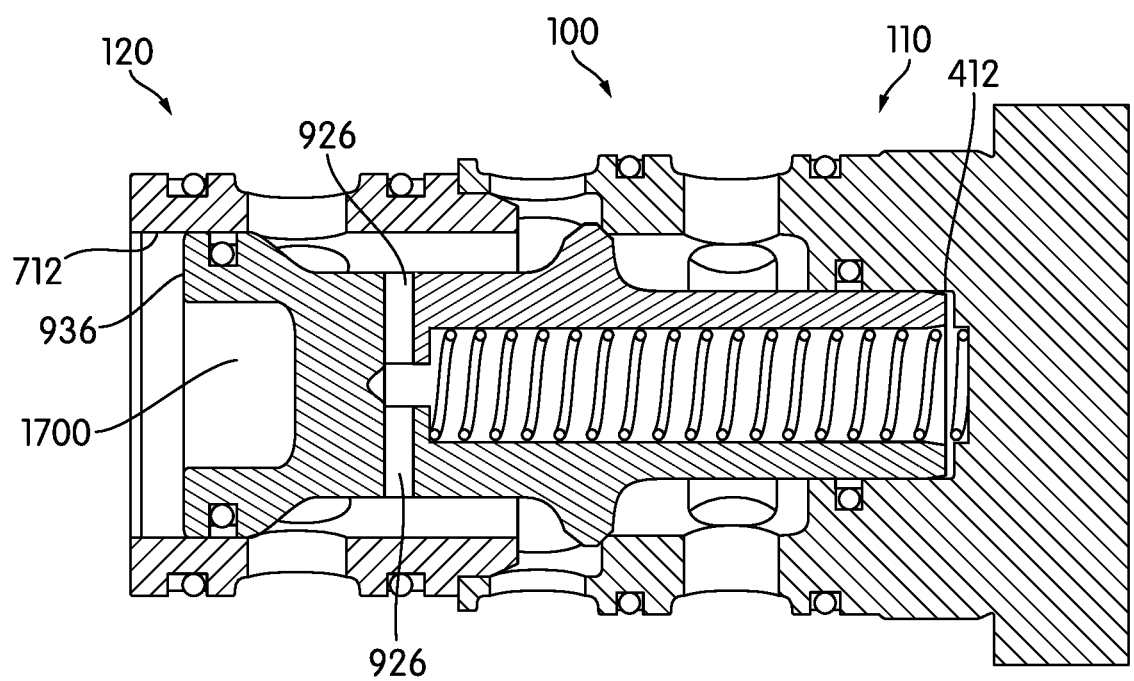
FIG. 18 is a cross-sectional view of the valve shown in FIG. 15, in a second configuration, about plane F-F in a second position.
Figure 19:
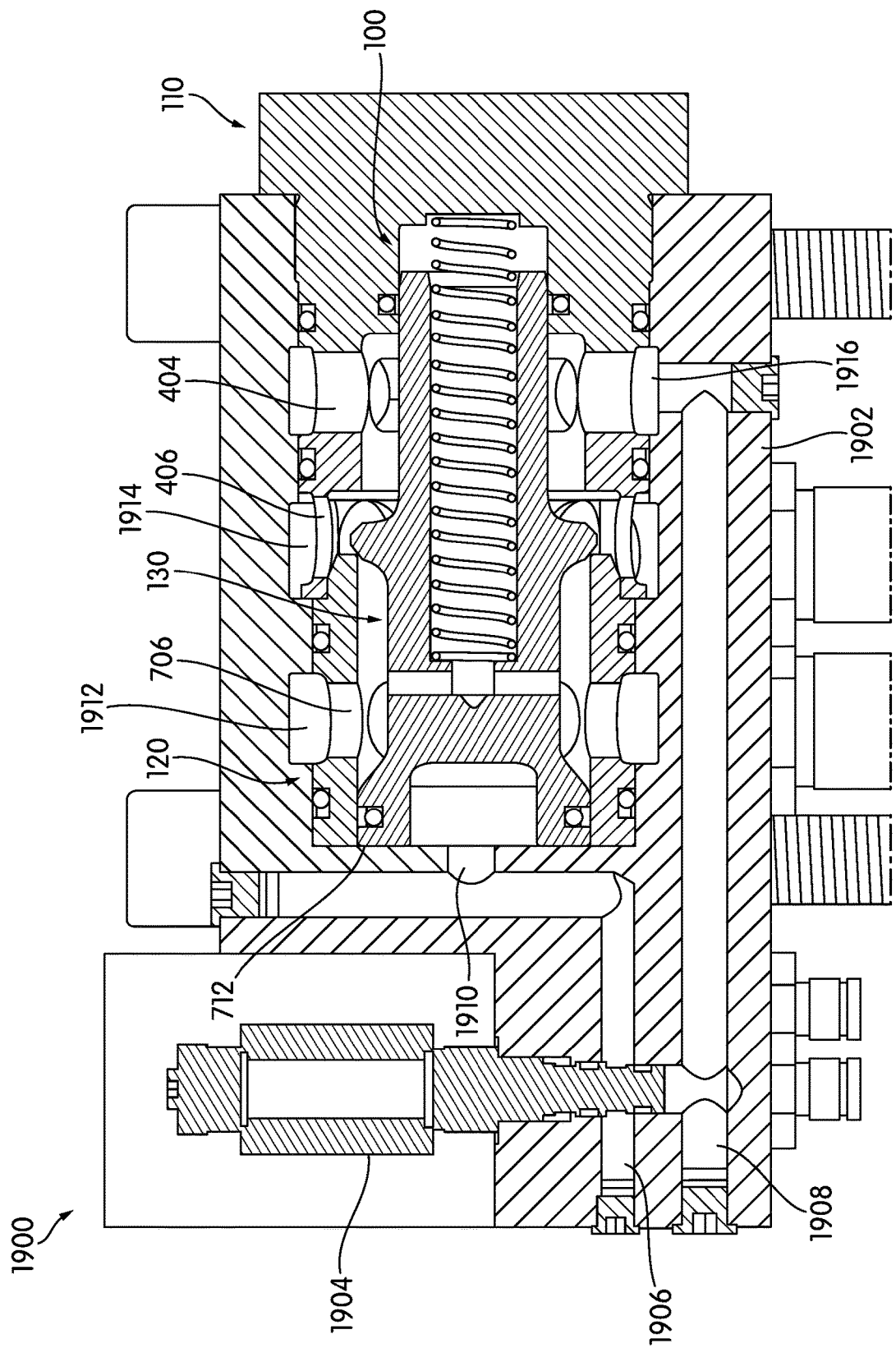
FIG. 19 is a cross-sectional view of a valve assembly including the valve shown in FIG. 17, according to an exemplary embodiment.

FIGS. 15-19 illustrate alternative variations of valve assembly 100. As shown in FIGS. 15 and 16, valve assembly 100 does not include cushion plug 1100. Rather, cushion receiver 412 directly receives poppet 130. Further, in FIGS. 15 and 16, pilot port 712 is enlarged to be equal to pilot surface 936. In FIGS. 17-19, pilot surface 936 includes a recess, shown as pilot recess 1700. Pilot recess 726 may assist in the transfer of force of hydraulic fluid from pilot port 712 to poppet 130. Further, in FIGS. 17-19, valve assembly 100 includes two hydraulic ports 926. The two hydraulic ports 926 may be offset one-hundred and eighty degrees apart. Similarly, more hydraulic ports 926 may be incorporated in valve assembly 100 or the angle between hydraulic ports 926 may be varied.

Referring specifically to FIG. 19, valve assembly 100 is shown installed in an installation, shown as valve installation 1900. Valve installation 1900 is configured to utilize valve assembly 100 to selectively route hydraulic fluid. Valve installation 1900 includes a plate, shown as sub-plate 1902. Sub-plate 1902 may be mounted to a chassis (e.g., a chassis of an ROV, etc.). In some embodiments, valve assembly 100 is screwed into sub-plate 1902 (e.g., using threaded portion 402, etc.). In other embodiments, valve assembly 100 is bolted in to sub-plate 1902. Valve assembly 100 may be manifold-mounted or may be a cartridge-style valve. Valve installation 1900 may also include a valve, shown as cartridge valve 1904. Cartridge valve 1904 may be a 2-position, 3-way solenoid operated valve. Cartridge valve 1904 may be used to control flow through a first port, shown as cartridge working port 1906, and a second port, shown as cartridge working port 1908.

Valve installation 1900 may further include a first fluid connection, shown as pilot supply 1910, a second fluid connection, shown as supply 1912, a third fluid connection, shown as working connection 1914, and a fourth fluid connection, shown as vent connection 1916. According to various embodiments, pilot supply provides hydraulic fluid to pilot port 712, supply 1912 provides hydraulic fluid to supply port 706, and vent connection 1916 provides vented hydraulic fluid to an external reservoir. According to an exemplary embodiment, working connection 1914 provides hydraulic fluid to a hydraulic device such as an arm, a tool, or a jaw. In an exemplary embodiment, supply 1912 provides hydraulic fluid to supply port 706 at a pressure that is on the order of thirty-four thousand kilopascals. In other embodiments, supply 1912 provides hydraulic fluid to supply port 706 at higher or lower pressures.

It is understood that valve assembly 100, and similarly valve installation 1900, may be implemented with various gas, fluid, and gas-fluid mixtures for causing articulation of the valve members. According to various embodiments, valve assembly 100 and all associated components are constructed from Stellite (e.g., Stellite 6B, etc.). In other examples, valve assembly 100 and all associated components may be constructed from Nitronic® (e.g., Nitronic® 50, Nitronic® 60, etc.), steels, steel alloys (e.g., wear resistant steel alloys, etc.), chromium alloys, cobalt alloys, copper alloys (e.g., brass, etc.), nickel alloys, and other metals or metallic alloys.

Figure 20:
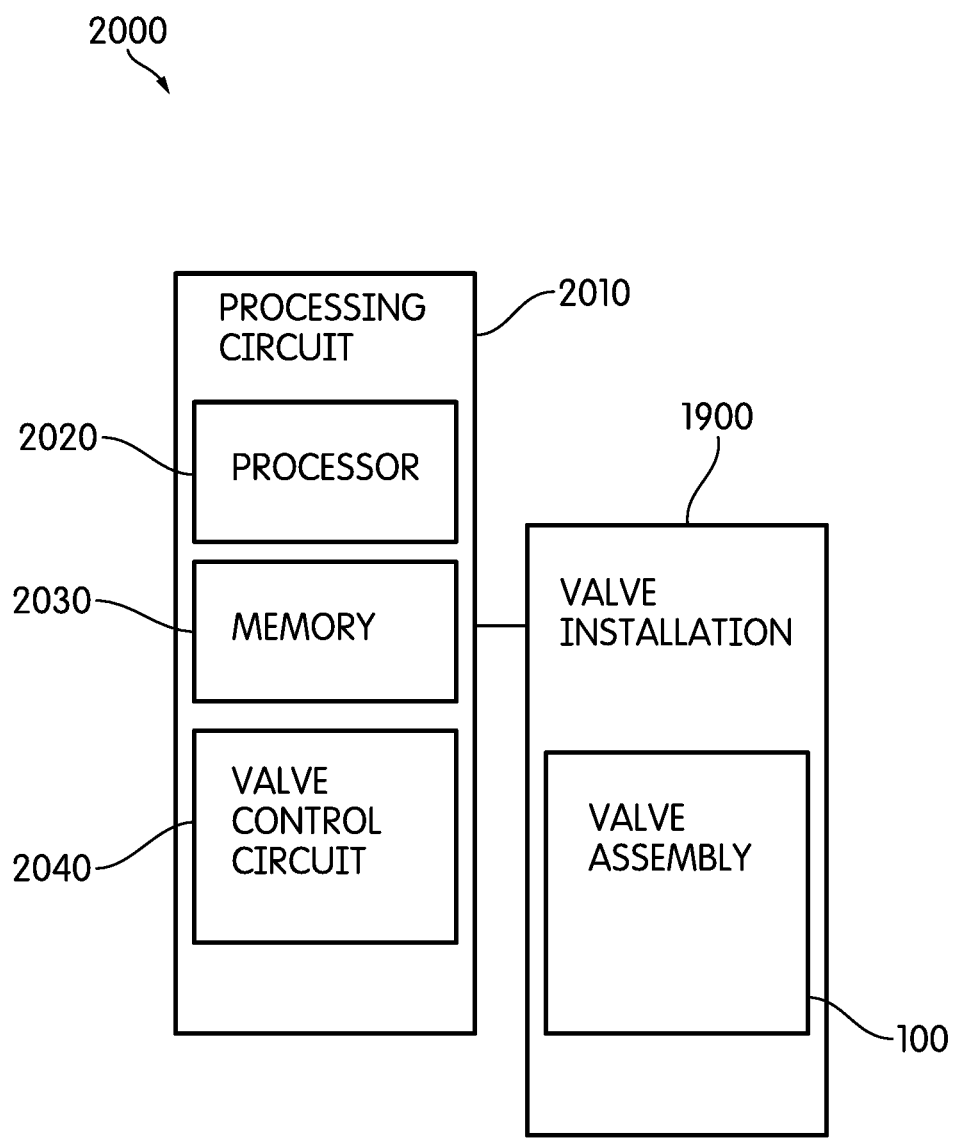
FIG. 20 is a control diagram for a controller for a valve assembly, such as the valve assembly shown in FIG. 1, according to an exemplary embodiment.

FIG. 20 illustrates a control diagrams for valve assembly 100. As shown in FIG. 20, a control diagram, shown as control diagram 2000, includes a circuit, shown as processing circuit 2010, a processor within processing circuit 2010, shown as processor 2020, a memory within processing circuit 2010, shown as memory 2030, a circuit within processing circuit 2010, shown as valve control circuit 2040, and valve installation 1900. Valve control circuit 2040 controls valve installation 1900 which further controls valve assembly 100. Memory 2030 stores instructions for processing circuit 2010. In some applications, memory 2030 stores monitored data from valve installation 1900 and/or valve assembly 100. According to various embodiments, valve installation 1900 and/or valve assembly 100 are communicable with processing circuit 2010. In some embodiments, valve installation 1900 and/or valve assembly 100 transmit monitored data (e.g., position, flow rate, pressure, etc.) to processing circuit 2010.

Processing circuit 2010 may be contained within or may be external to valve installation 1900 or valve assembly 100. Valve control circuit 2040 is configured to facilitate manipulation of the position of valve assembly 100 to selectively route hydraulic fluid. Similarly, processing circuit 2010 may monitor the position of valve assembly 100. The monitored position may relate to a pressure and/or flow rate of hydraulic fluid. By having access to monitored position data for valve assembly 100, processing circuit 2010 is capable of comparing the monitored position to a desired position. For example, if the monitored position deviates an undesirable amount from the desired position, valve control circuit 2040 may instruct valve installation 1900 to cease to supply fluid to valve assembly 100. Such a comparison by processing circuit 2010 may prevent excessive leakage of hydraulic fluid.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

The present invention is not limited to the particular methodology, protocols, and expression of design elements, etc., described herein and as such may vary. The terminology used herein is for the purpose of describing particular embodiments only, and is not intended to limit the scope of the present invention.

As used herein, the singular forms include the plural reference and vice versa unless the context clearly indicates otherwise. The term "or" is inclusive unless modified, for example, by "either." For brevity and clarity, a particular quantity of an item may be described or shown while the actual quantity of the item may differ. Other than in the operating examples, or where otherwise indicated, all numbers and reference characters expressing measurements used herein should be understood as modified in all instances by the term "about," allowing for ranges accepted in the art.

Unless defined otherwise, all technical terms used herein have the same meaning as those commonly understood to one of ordinary skill in the art to which this invention pertains. Although any known methods, devices, and materials may be used in the practice or testing of the invention, the methods, devices, and materials in this regard are described herein.

It should be understood that no claim element herein is to be construed under the provisions of 35 U.S.C. § 112(f), unless the element is expressly recited using the phrase "means for."

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in deposit to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, Oreg., XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

What is claimed:

1. A valve assembly comprising:
    an upper sleeve; the upper sleeve comprises: a working port located through the side of the upper sleeve, the working port configured to supply hydraulic fluid to an output; and a vent port located through the side of the upper sleeve, the vent port configured to vent hydraulic fluid from the valve assembly;
    a lower sleeve coupled to the upper sleeve, the lower sleeve comprising:
        a bottom face;
        a side;
        a supply port extending through the side of the lower sleeve; and
        a pilot port extending through the bottom face of the lower sleeve; and
    a poppet operable between a first position and a second position, the poppet contained within the upper sleeve and the lower sleeve, the poppet comprising:
        a first end;
        a second end spaced from the first end;
        a side adjacent one of the first end and the second end;
        a central cavity extending from the first end of the poppet towards the second end of the poppet; and
        a hydraulic port extending from the side of the poppet into the central cavity, the hydraulic port configured to receive hydraulic fluid at a first flow rate from the supply port and to supply hydraulic fluid to the central cavity at a second flow rate less than the first flow rate;
    wherein the upper sleeve further comprises a poppet receiver configured to receive the first end of the poppet;
    wherein the central cavity and the poppet receiver facilitate accumulation of hydraulic fluid inside the central cavity and the poppet receiver; and
    wherein the poppet is gradually biased towards the second position as hydraulic fluid is accumulated in the central cavity and the poppet receiver.

2. The valve assembly of claim 1, wherein the lower sleeve further comprises a poppet chamber configured to receive the poppet;
    wherein the poppet chamber includes the bottom face and the pilot port;
    wherein the pilot port is configured to receive hydraulic fluid and to transfer the hydraulic fluid into the poppet chamber;
    wherein the poppet chamber is configured to facilitate accumulation of hydraulic fluid in the poppet chamber between the bottom face and the poppet; and
    wherein the hydraulic fluid that accumulates in the poppet chamber is caused to bias the poppet towards the first position.

3. The valve assembly of claim 2, wherein the hydraulic fluid accumulated in the central cavity and the poppet receiver is expelled from the valve assembly via the hydraulic port as the poppet transitions from the second position to the first position; and
    wherein a flow rate at which hydraulic fluid is expelled via the hydraulic port is related to a resistance to movement of the poppet.

4. The valve assembly of claim 3, wherein the flow rate at which hydraulic fluid is expelled via the hydraulic port decreases as the poppet approaches the first position such that the poppet is decelerated prior to reaching the first position.

5. The valve assembly of claim 2, wherein the hydraulic fluid accumulated in the poppet chamber is expelled via the pilot port as the poppet transitions from the first position to the second position; and
    wherein a flow rate at which hydraulic fluid is expelled via the pilot port is related to a resistance to movement of the poppet.

6. The valve assembly of claim 5, wherein the flow rate at which hydraulic fluid is expelled via the pilot port decreases as the poppet approaches the second position such that the poppet is decelerated prior to establishing the second position.

7. The valve assembly of claim 2, wherein the second end of the poppet is in contact with the hydraulic fluid when hydraulic fluid is accumulated in the poppet chamber;
    wherein the central cavity includes a base that is substantially opposite to the second end of the poppet;
    wherein the second end of the poppet defines a first area;
    wherein the first end of the poppet defines a second area;
    wherein the base of the central cavity defines a third area; and
    wherein the first area is greater than the sum of the second area and the third area such that when the poppet chamber accumulates a threshold amount of hydraulic fluid, a force exerted by the hydraulic fluid on the second end of the poppet is greater than a force exerted by the hydraulic fluid on the first end of the poppet and the base of the central cavity.

8. The valve assembly of claim 1, wherein the poppet further comprises:
    an intermediate portion located between the first end and the second end, the intermediate portion configured to radially protrude from the poppet, the intermediate portion comprising a vent surface proximate the first end and a supply surface opposite the first end; and
    a lower portion including the second end, the lower portion configured to radially and axially protrude from the poppet, the lower portion comprising a lower surface opposite the second end;
    wherein the supply surface and the lower surface are configured to be in contact with the hydraulic fluid received from the supply port; and
    wherein the supply surface has a first area and the lower surface has a second area equal to the first area such that a first force exerted by the hydraulic fluid received from the supply port on the supply surface is substantially equal to a second force exerted by the hydraulic fluid received from the supply port on the lower surface.

9. The valve assembly of claim 1, further comprising:
    a spring located within the central cavity of the poppet, the spring configured to provide a spring force on the poppet resisting movement of the poppet towards the first position.

10. A valve assembly comprising:
    an upper sleeve; the upper sleeve comprises: a working port located through the side of the upper sleeve, the working port configured to supply hydraulic fluid to an output; and a vent port located through the side of the upper sleeve, the vent port configured to vent hydraulic fluid from the valve assembly;
    a lower sleeve coupled to the upper sleeve, the lower sleeve comprising:
        a bottom face;

a side;
a supply port extending through the side of the lower sleeve; and
a pilot port extending through the bottom face of the lower sleeve; and
a poppet operable between a first position and a second position, the poppet contained within the upper sleeve and the lower sleeve, the poppet comprising:
a first end;
a second end spaced from the first end;
a side adjacent one of the first end and the second end;
a central cavity extending from the first end of the poppet towards the second end of the poppet; and
a hydraulic port extending from the side of the poppet into the central cavity, the hydraulic port configured to receive hydraulic fluid at a first flow rate from the supply port and to supply hydraulic fluid to the central cavity at a second flow rate less than the first flow rate;
a first wear band coupled to the poppet proximate the first end of the poppet and configured to interface with the upper sleeve as the poppet operates between the first position and the second position; and
a second wear band coupled to the poppet proximate the second end of the poppet and configured to interface with the lower sleeve as the poppet operates between the first position and the second position.

11. A valve assembly comprising:
an upper sleeve;
a lower sleeve coupled to the upper sleeve, the lower sleeve comprising:
a bottom face;
a side;
a supply port extending through the side of the lower sleeve; and
a pilot port extending through the bottom face of the lower sleeve; and
a poppet operable between a first position and a second position, the poppet contained within the upper sleeve and the lower sleeve, the poppet comprising:
a first end;
a second end spaced from the first end;
a side adjacent one of the first end and the second end;
a central cavity extending from the first end of the poppet towards the second end of the poppet; and
a hydraulic port extending from the side of the poppet into the central cavity, the hydraulic port configured to receive hydraulic fluid at a first flow rate from the supply port and to supply hydraulic fluid to the central cavity at a second flow rate less than the first flow rate;
wherein the upper sleeve comprises:
a working port located on the side of the upper sleeve, the working port configured to supply hydraulic fluid to an output; and
a vent port located on the side of the upper sleeve, the vent port configured to vent hydraulic fluid from the valve assembly;
wherein the working port is located between the vent port and the supply port; and
wherein the side of the lower sleeve and the side of the upper sleeve are substantially coplanar.

12. The valve assembly of claim 11, wherein the side of the upper sleeve further comprises a threaded portion; and wherein the threaded portion is configured to be screwed in to or bolted on to a sub-plate.

* * * * *